United States Patent

[11] 3,609,322

[72] Inventors Lonnie A. Burnett;
Norman D. Neal; George L. Wissel; Harold
D. Wiebe, all of Cincinnati, Ohio
[21] Appl. No. 824,344
[22] Filed Apr. 17, 1969
[45] Patented Sept. 28, 1971
[73] Assignee Cincinnati Milacron Inc.
Cincinnati, Ohio

[54] DIGITAL TRACER CONTROL
9 Claims, 29 Drawing Figs.
[52] U.S. Cl. ................................................. 235/151.11,
90/13.4, 90/DIG. 27, 318/578
[51] Int. Cl. ................................................. B23q 35/12,
G06f 15/46
[50] Field of Search .......................................... 235/151.11;
90/13, 13.4, 13.5, DIG. 27, 13 B; 318/570, 571,
576, 578

[56] References Cited
UNITED STATES PATENTS
| | | | |
|---|---|---|---|
| 3,283,129 | 1/1966 | Kelling ........................ | 235/151.11 X |
| 3,292,495 | 12/1966 | Hill et al. ..................... | 235/151.11 X |
| 3,300,696 | 1/1967 | Fillmore et al. ............... | 318/578 |
| 3,449,742 | 6/1969 | Stapleton ..................... | 318/578 |

*Primary Examiner*—Eugene G. Botz
*Assistant Examiner*—Felix D. Gruber
*Attorneys*—Howard T. Keiser and Jack J. Earl

ABSTRACT: A digital tracer control responsive to inputs from a tracing head for controlling servomechanism inputs of a machine. From the tracing transducers, the system immediately converts the analogue tracing signal into a digital representation. Through the use of digital differential analyzers or modifications thereof, output pulse rates are obtained analogous to tracer error and suitable for use in machine servosystems. The system is capable of tracing a three-dimensional model in any plane within a coordinate system defined by the machine axes.

DEPTH MODE

PLANAR MODE

INVENTORS
LONNIE A. BURNETT
NORMAN D. NEAL
GEORGE L. WISSEL
HAROLD D. WIEBE

BY
Howard Ilieven
& Jack J. Earl
ATTORNEYS

COMBINATION MODE

PLANE STEERING MODE

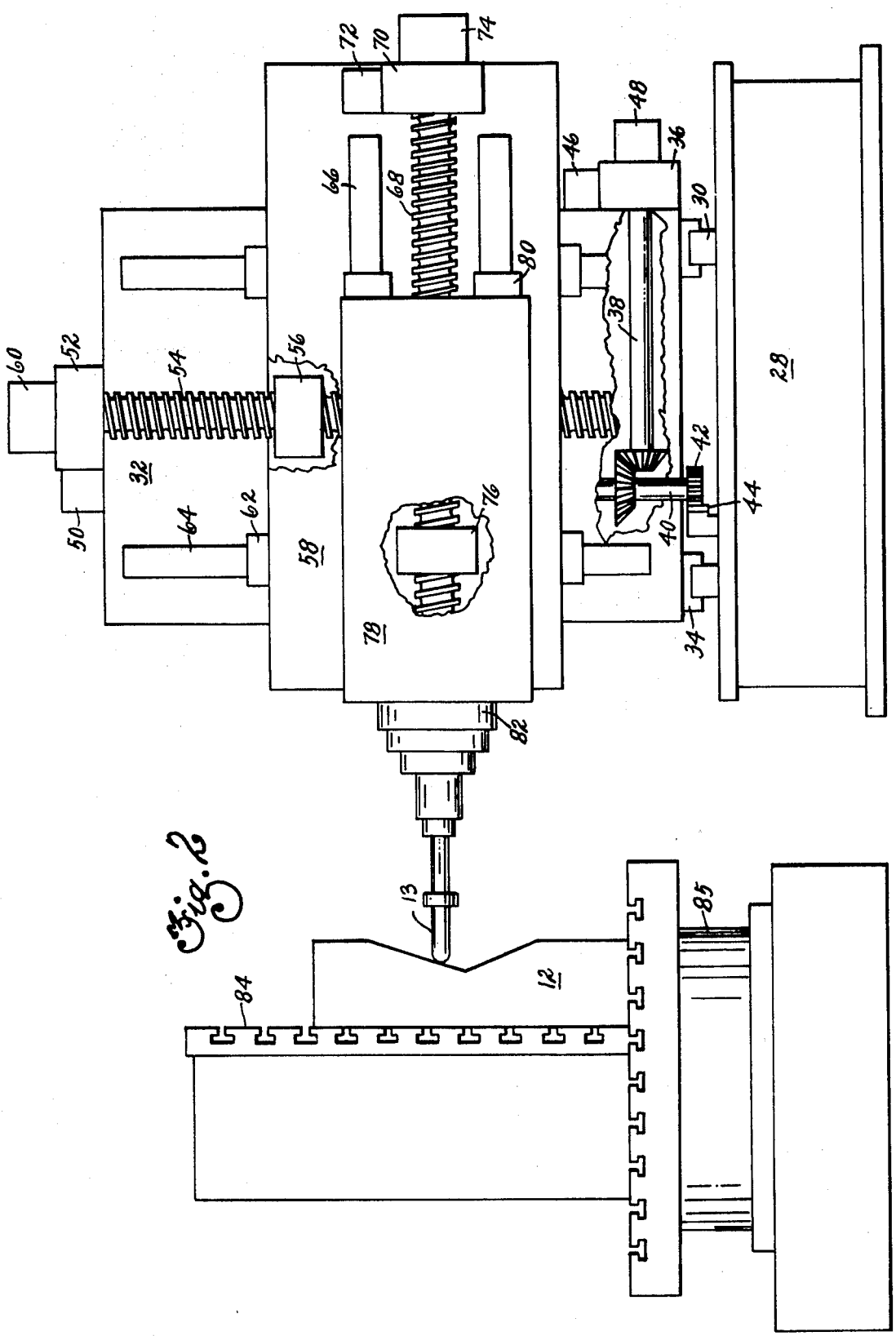

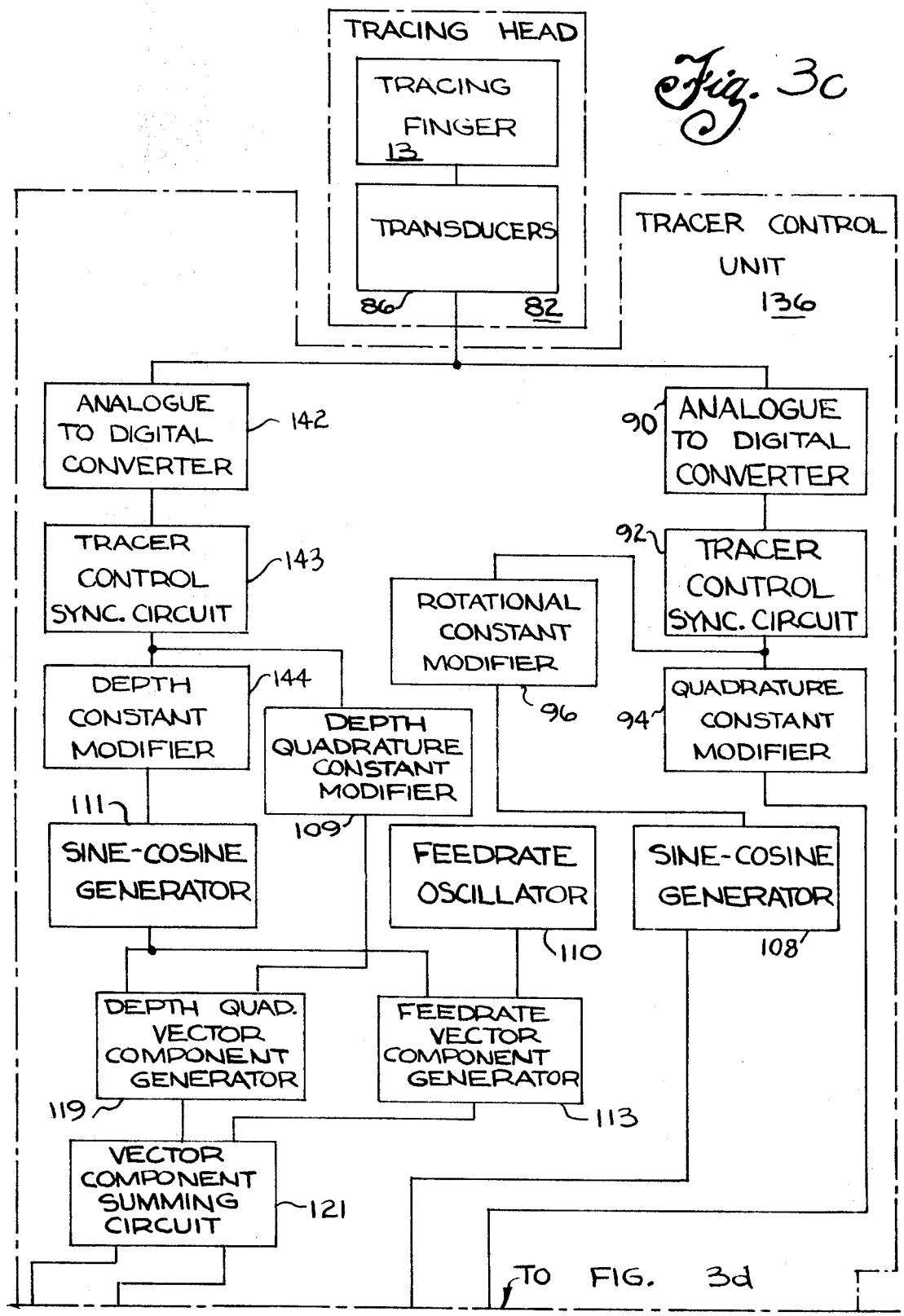

HANG FREE POSITION

SYSTEM NULL DEFINED

OVERDEFLECTION

UNDERDEFLECTION

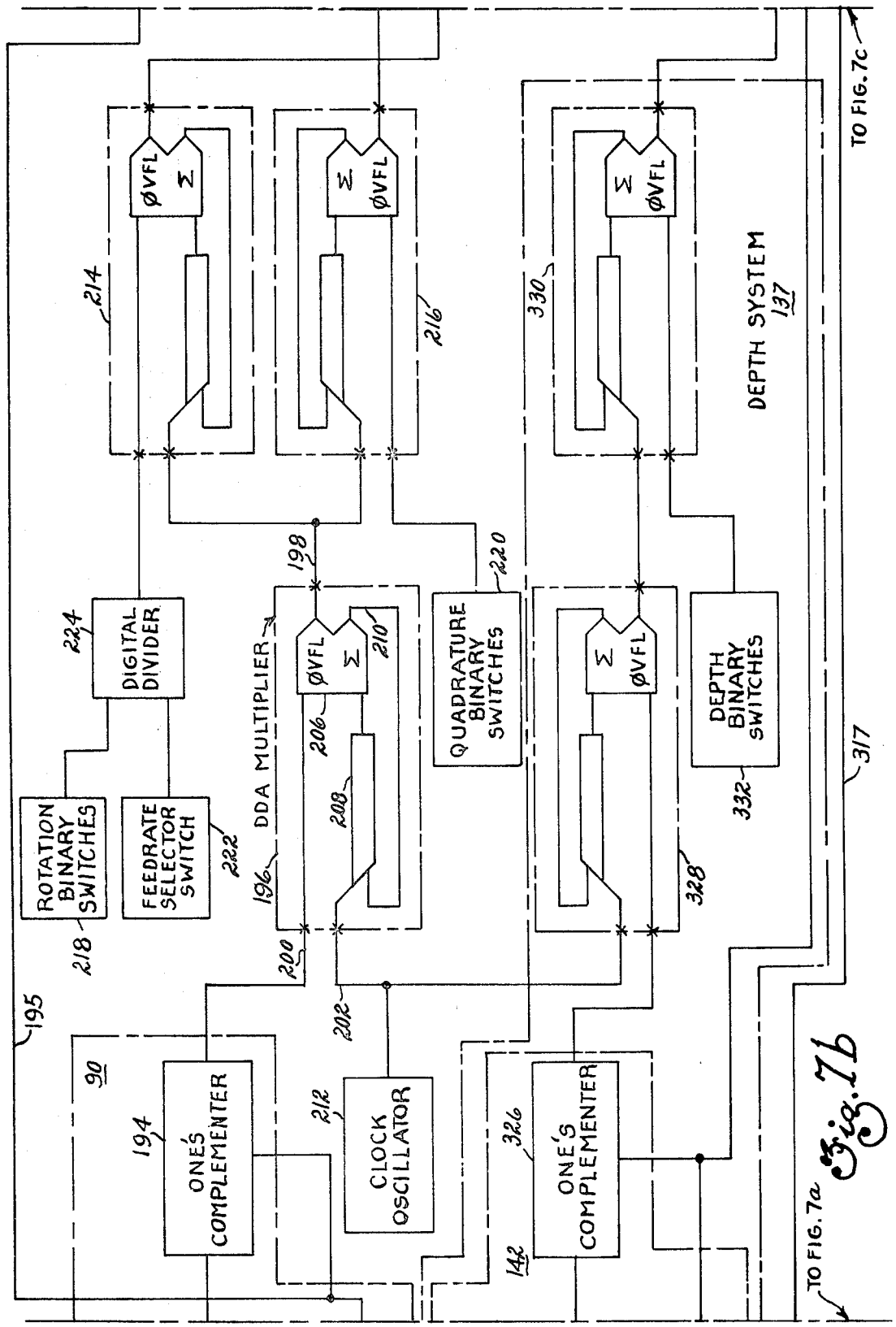

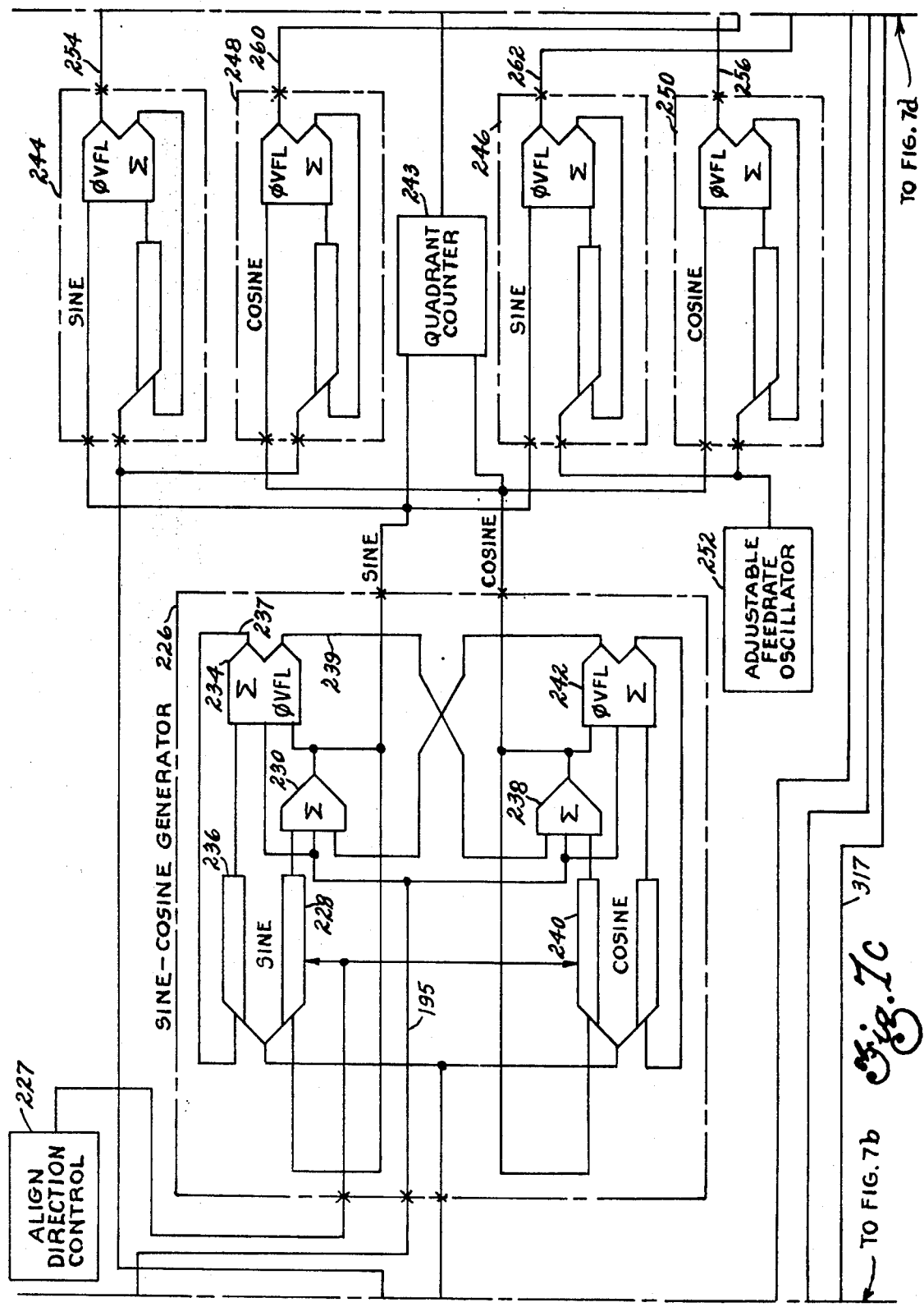

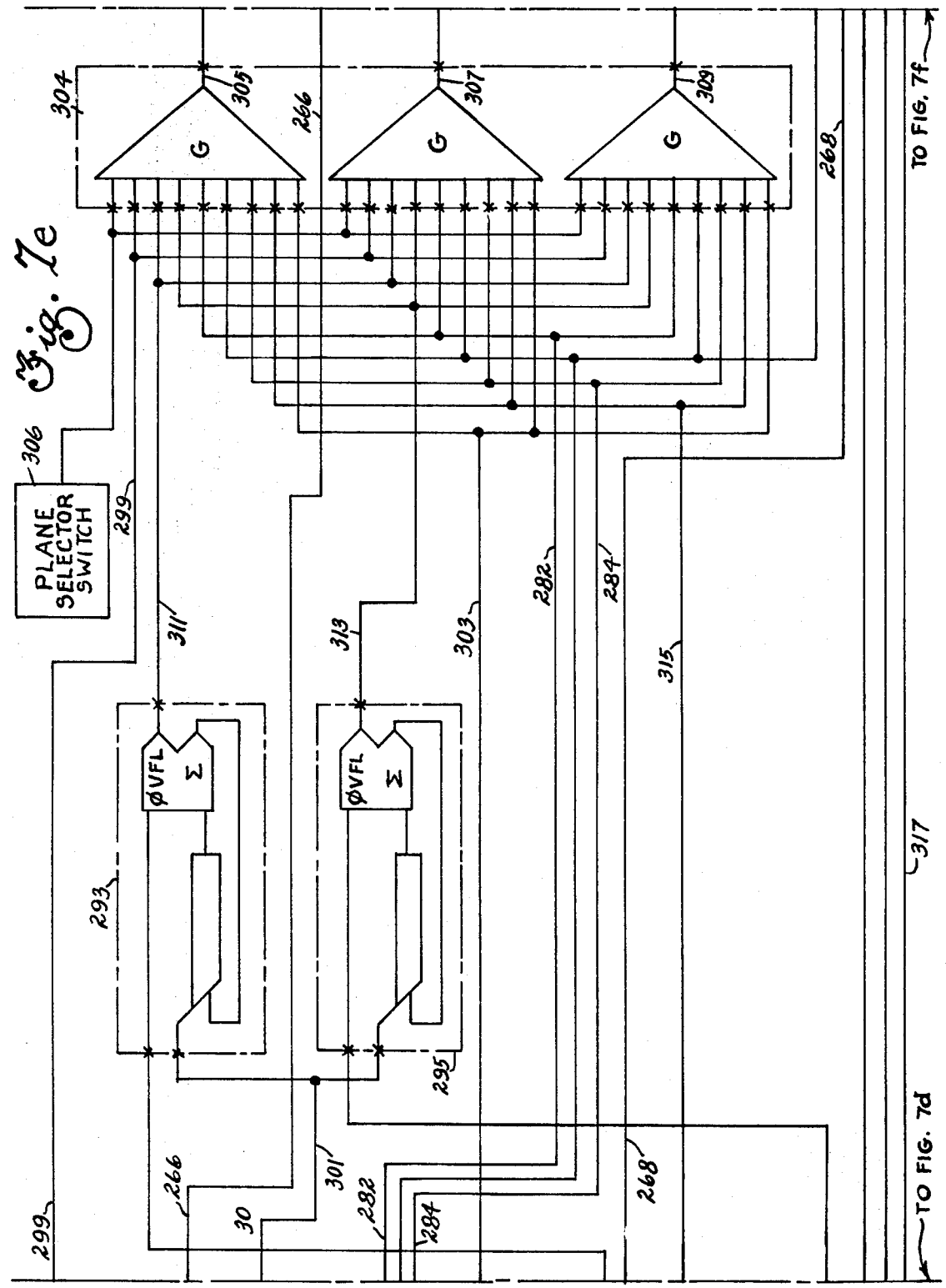

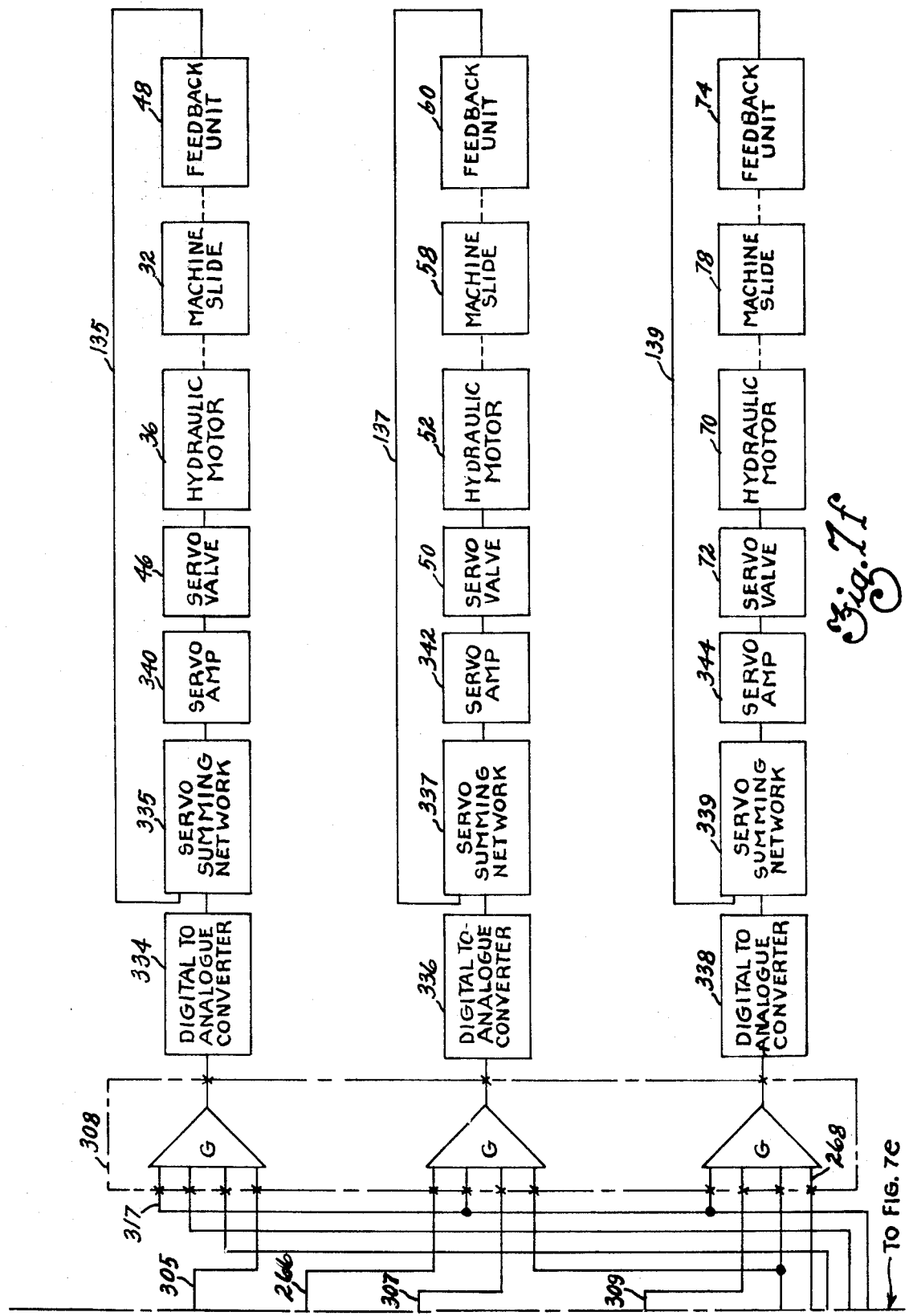

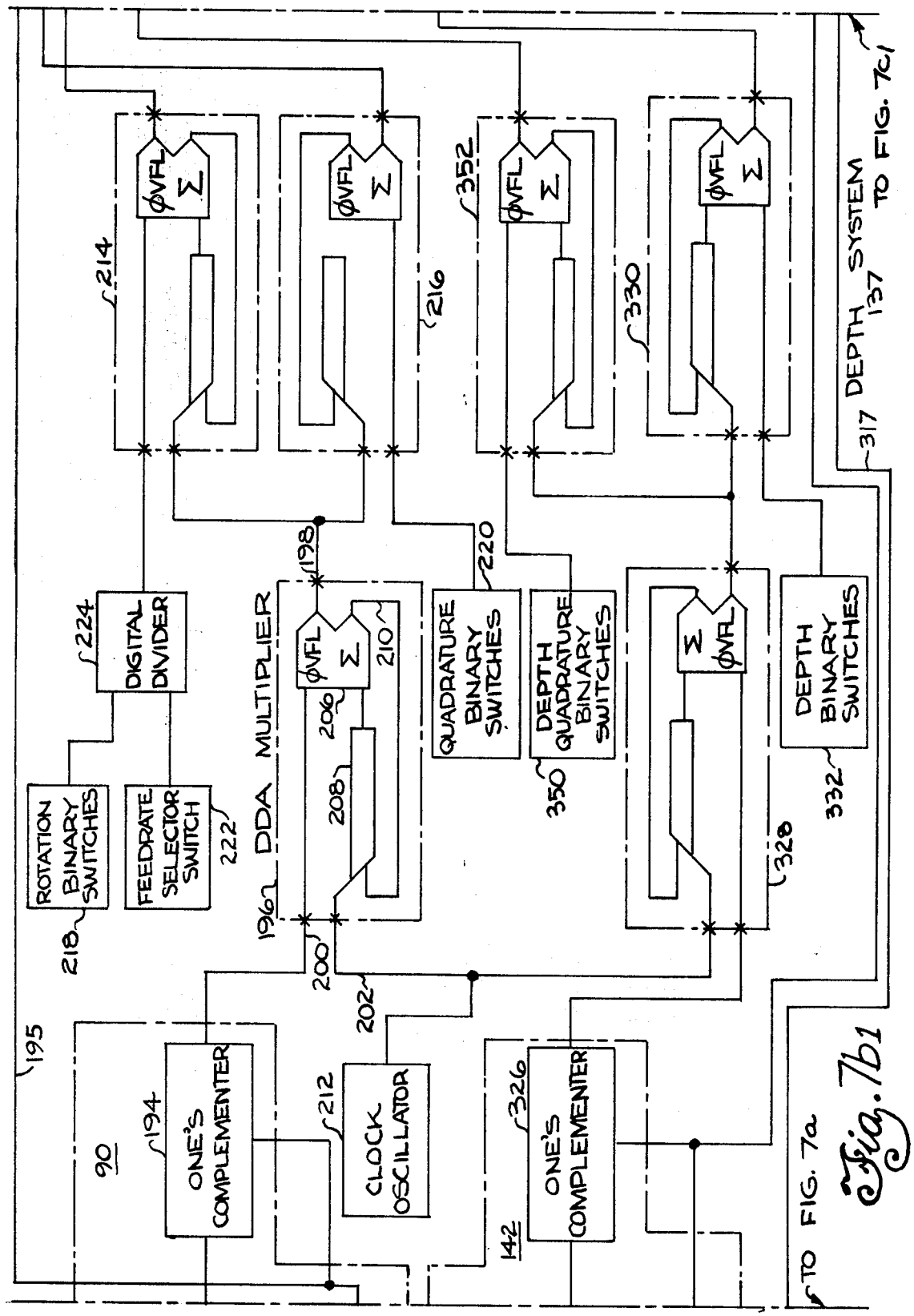

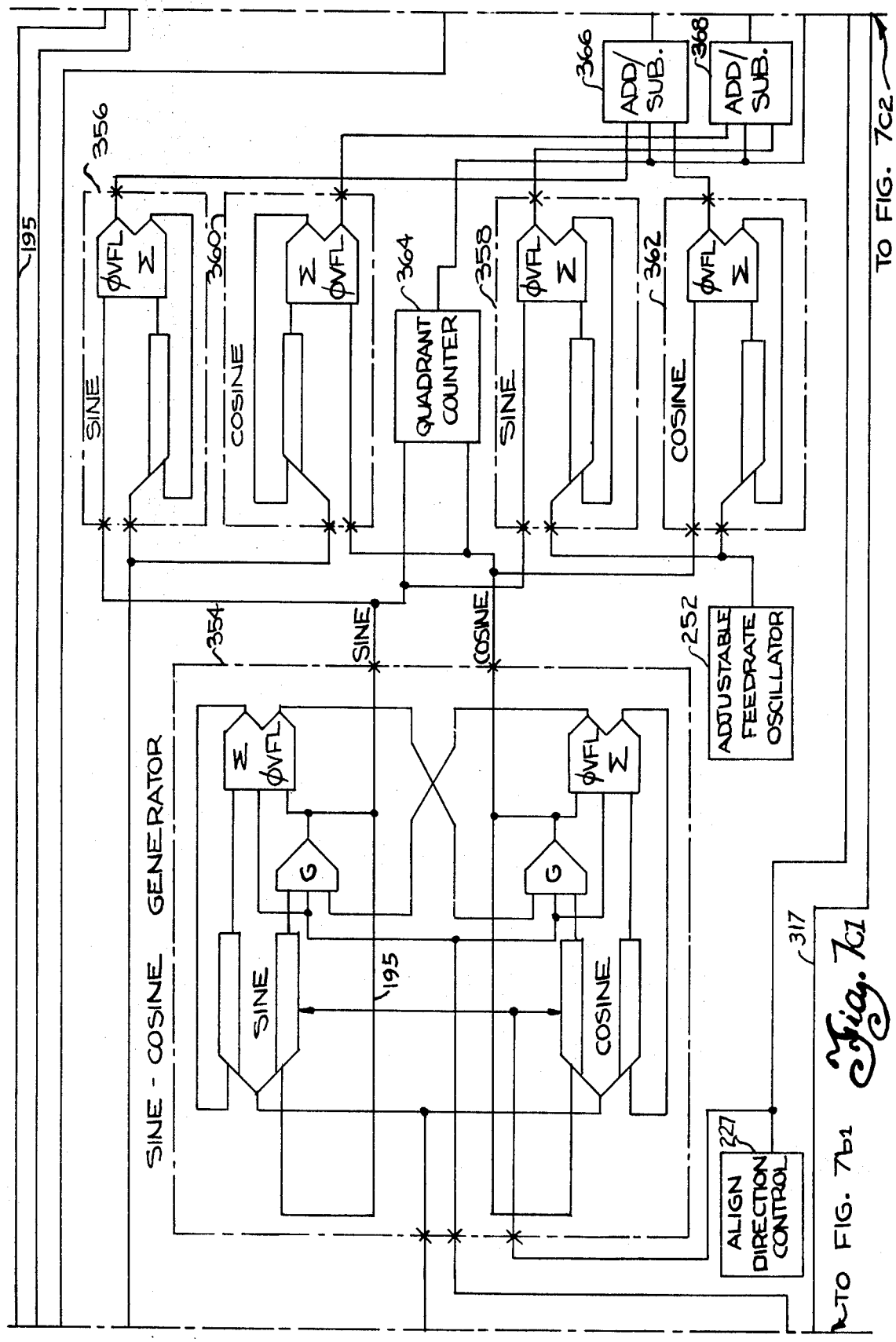
Fig. 7c1

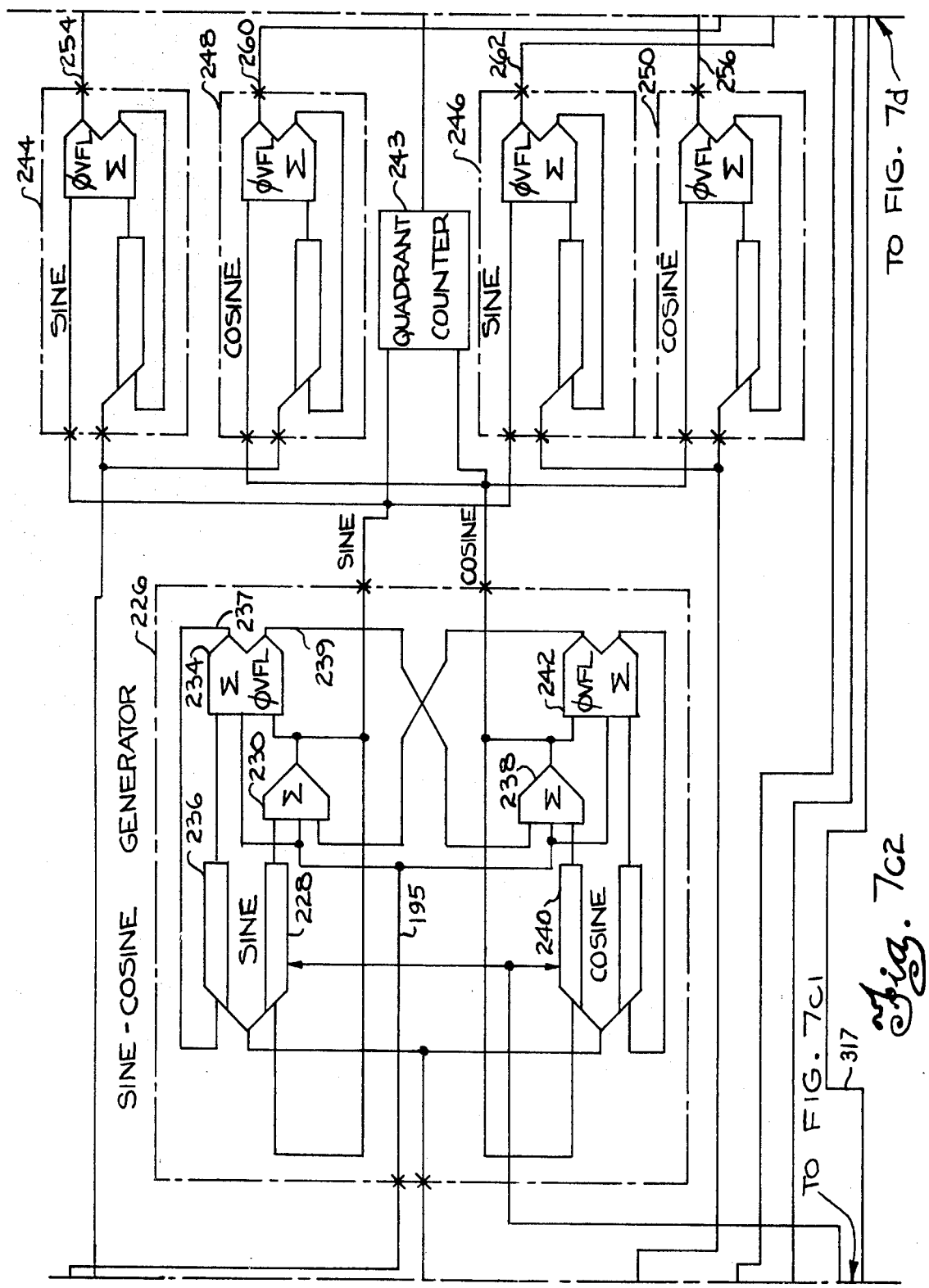
Fig. 7c2

DIGITAL TRACER CONTROL

BACKGROUND

Other tracer systems use discrete component analogue circuits that are subject to several inherent disadvantages. These tracing systems are controlled by changing the magnitude and phase of an error signal continuous in time. A major problem is drift of circuit parameters that causes erratic operation of the machine and resulting inaccuracies in the trace. Further, the critical nature of analogue circuits requires that they be adjusted to operate in a relatively narrow tracing velocity range. Consequently a wide range of materials cannot be accurately cut on the same machine.

This invention proposes a tracing system in which the method for creating a signal analogous to tracing error and continuous in time is improved. In addition, the application of a digital control to three-dimensional tracing is new. By using a digital control the problem of drift is eliminated; therefore, accuracies are improved. Second, a digital control provides system stability throughout a wide range of tracing velocities. Third, the high speed and reliability inherent in a digital control facilitates interfacing with recording devices, computers and standard machine servo mechanisms. Finally, a digital design allows the use of microcircuits and a smaller more reliable package may be developed.

Conventional tracers have three modes of operation. First, the Depth Mode, or single dimensional tracing provides a tracer response in a direction parallel to the longitudinal axis of a tracing head. Second, the Planar Mode, or two-dimensional tracing is the ability to trace in a plane parallel to one of the coordinate planes defined by the machine axes. When a three-dimensional contour has to be traced, the Combination Mode is used. In this mode, it is necessary to separate the contour into two independent tracing paths. First, the planar path represents a planar slice of the contour perpendicular to the longitudinal axis of a tracing head. Second, the depth path represents changes at the point of the planar slice in a direction parallel to the longitudinal axis of a tracing head. The planar and depth paths are simultaneously tracked, processed by independent tracer control circuits and transmitted to their respective machine tool axes.

There are two major disadvantages to tracing in the Combination Mode. First, there are geometric limitations. The model must have contours that can readily be defined by depth and planar paths. In addition, the type of tracing head may limit the rate of change of depth with respect to a planar slice. Second, there is no control over the feedrate in the depth direction; it is a function of error. In the Combination Mode, tracing is the result of two feedrate vectors. First, the planar vector is determined by the feedrate selected by the operator and controls the tracing rate along the planar path. Second, the depth vector is determined by the depth error and can not be controlled externally. This assumes that the system response in the depth direction will be able to follow the selected feedrate.

To overcome the disadvantages of conventional tracers, this invention teaches the Plane Steering Mode as the best means of tracing in three dimensions. Plane steering is a two-dimensional tracing mode with the ability to steer the tracing plane about a contour. Thus, the tracing plane is always approximately normal to the surface being traced. Plane steering is selected by the operator; who, by manual controls, has the ability to rotate the tracing plane about one or more of the coordinate axes. This is accomplished in the tracer control which then translates motion in the new plane into resultant velocity vectors parallel to the axes of motion of the machine. Consequently, models can be traced directly with no need to make special patterns or templates.

Accordingly, this invention provides for a reliable high speed digital tracer control that eliminates drift problems and allows tracing in a wide range of velocities. Consequently, tracing in the Depth, Planar, and Combination Modes is improved. Further, the Plane Steering Mode permits direct tracing in any plane within the machine coordinate system.

SUMMARY

This invention is most applicable to a tracing head mounted in a standard machine tool configuration. The digital tracer control receives inputs provided by the operator in combination with error signals form the tracing head and transmits command pulse rates to the machine servo system. The servo system then moves the machine slides at the commanded velocities so as to decrease the error detected by the tracing head.

A tracing finger in physical contact with the model imparts a deflection to transducers. The transducers provide a continuous electrical signal analogous to deflection. An analogue to digital converter converts the continuous electric signal to a digital error signal representing a number word having a value proportional to deflection. The digital error signal is synchronized with the tracer control in a synchronization circuit by modifying a constant pulse rate from a clock oscillator proportionally to the number word value. The modified pulse rate provides for the generation of normal and rotational system response signals to the tracking of the tracing finger. The rotational response signal drives two digital integrators connected so as to provide a sine-cosine generator. The generator produces output signals which are digital representations of the sine and cosine magnitudes of the angle of rotation. The sine and cosine magnitudes are used to redefine two tracing vectors into two new usable vector quantities. The first tracing vector, feedrate vector, is tangential to the tracing path at the point of the trace. The second tracing vector, quadrature vector, has a direction normal to the tracing path at the point of the trace, and its magnitude is proportional to tracing error. The feedrate vector and the quadrature vector define a tracing plane. The rotational system generates vector components by projecting each tracing vector onto axes, in the tracing plane, parallel to the machine axes. The corresponding vector components are summed to produce two new vectors. The steering system allows a first rotation of the tracing plane about a coordinate axis parallel to either one of the axes defined by the two new vectors. The plane may be rotated a second time about a coordinate axis perpendicular to the first rotational axis. This permits the tracing plane to be skewed within the coordinate system defined by the machine axes. The angles of steering are measured in terms of their trigonometric magnitudes. These magnitudes are used to project the two new vector outputs of the rotational system onto coordinate axes. The projection generates vector components which are summed to produce command velocity vectors parallel to the coordinate axes. These command vectors are gated to the appropriate servo mechanism inputs to move the machine slides at the desired velocities and in a direction to decrease the error detected by the tracing head.

DESCRIPTION OF DRAWINGS

While the invention has been illustrated in some detail according to a preferred embodiment shown in the accompanying drawings, and while the preferred illustrated embodiment will be described in some detail, there is no intention to thus limit the invention to such details. On the contrary, it is intended to cover all modifications, alternations and equivalents falling within the spirit and scope of the appended claims. In the block and schematic diagrams, the solid lines interconnecting the various elements are only indicative of signal flow. Consequently, a line may signify one or more conductors, each carrying a specific signal. The uniform dashed lines represent mechanical connections. The combined long and short dashed lines define specific combinations of elements.

FIG. 2 is a perspective view of a machine which may be controlled according to he method and apparatus of the present invention.

FIGS. 3c and 3d when joined along the indicated junction line, represent the functional block and line diagram of an alternative embodiment of the control system.

FIGS. 7a, 7b, 7c, 7d, 7e, and 7f, when joined along the indicated junction line, comprise a detailed schematic diagram of the entire digital tracer control.

FIGS. 7b1, 7c1, and 7c2, comprise a detailed schematic diagram of an alternative embodiment and should be joined along the indicated junction lines with FIGS. 7a, 7d, 7e, and 7f.

GENERAL DESCRIPTION

Before proceeding with the circuit descriptions, a further expansion of tracing philosophies is necessary.

Figure 1A:
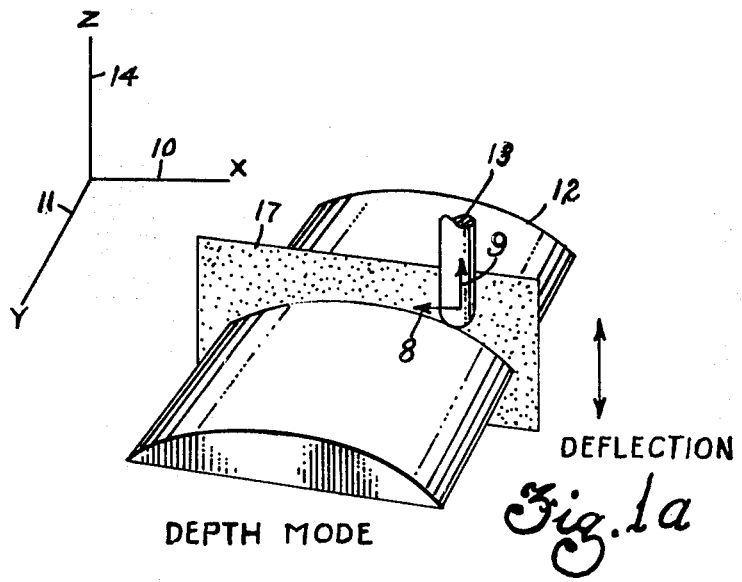
FIGS. 1a, 1b, 1c and 1d, graphically show the abilities and limitations of the four tracing modes.

FIGS. 1a illustrates one dimensional tracing in the Depth Mode. After studying the model 12, the operator must select coordinate directions that define a family of parallel planes in which the desired contour may be traced. In this case, the selected coordinate directions are along the X-axis 10 and the Z-axis 14. The family of parallel planes progress perpendicular to the Y-axis 11. The operator must then select the tracing feedrate and initiate the trace. The tracing finger 13 will detect error in a direction parallel to the Z-axis 14. The selected feedrate and the tracing error respectively determine the constant feedrate vector 8 and the error vector 9. These two vectors define the tracing plane 17 at any given time.

Figure 1B:
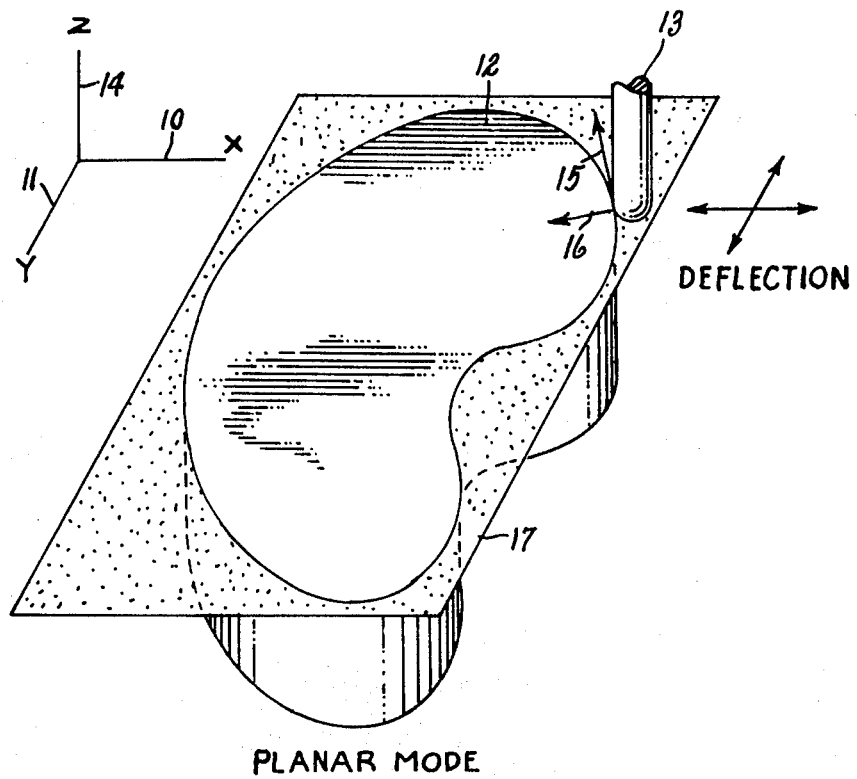
Figure 1C:
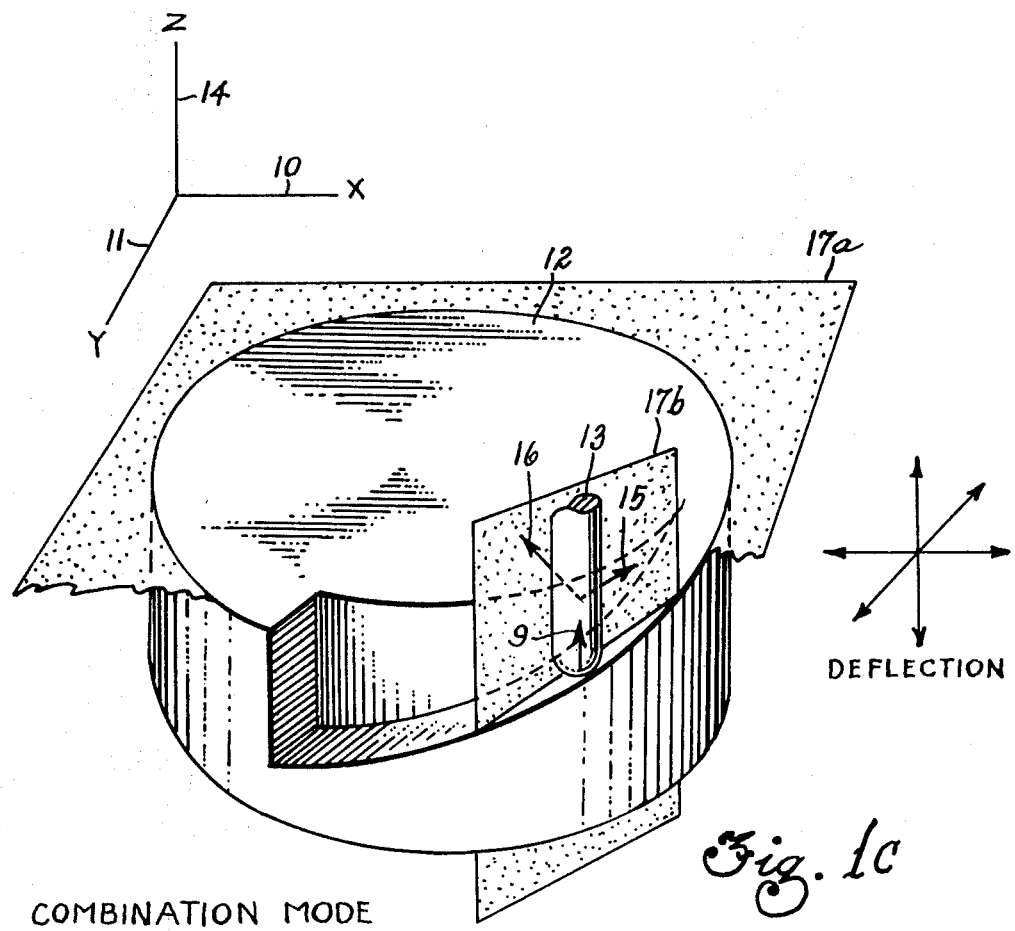

Tracing in two dimensions, or in the Planar Mode is shown in FIG. 1b. In this case, the operator will select coordinate directions along the X-axis 10 and the Y-axis 11 to define a family of planes perpendicular to the Z-axis 14. The tracing plane 17 is defined by the feedrate vector 15 and the quadrature vector 16, which originate at the point of contact between the tracing finger 13 and the model 12. FIG. 1c illustrates the historic method of tracing in three dimensions or the Combination Mode. In this case, the operator selects a feedrate and coordinate directions the same as in the Planar Mode. However, since there are two independent tracing paths and two points of contact on the tracing finger 13, two sets of response vectors will exist. The feedrate vector 15 and the quadrature vector 16 define the tracing plane 17a. The feedrate vector 15 and the error vector 9 define a second tracing plane 17b. The responses in each tracing plane 17a and 17b are processed in independent systems and routed to the appropriate machine servo mechanisms to produce simultaneous three axis motion.

Figure 1D:
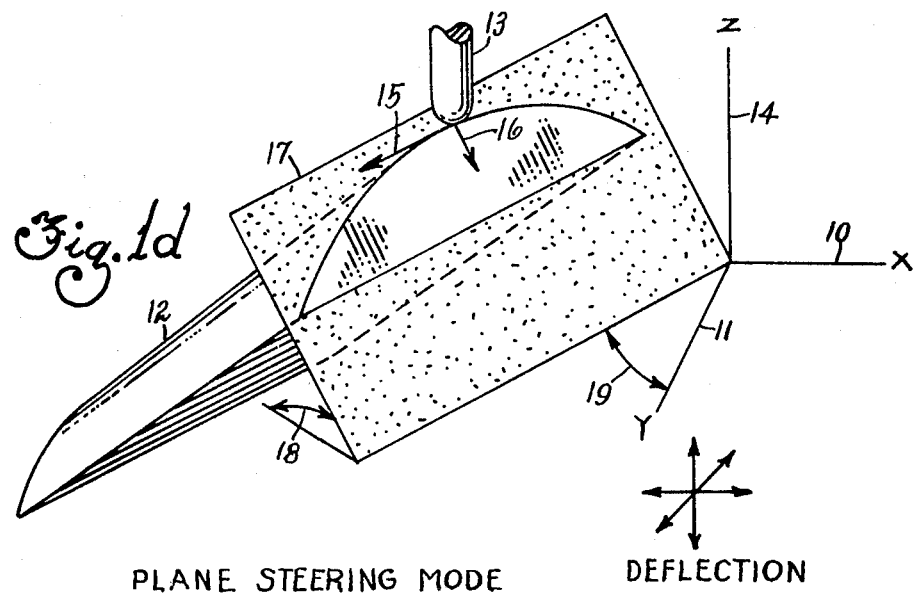

The newest and most practical tracing mode, uniquely taught by this invention, is illustrated in FIG. 1d. There may be many surfaces on a model that cannot be accurately traced with a tracing plane that is parallel to one of the coordinate planes. The Plane Steering Mode overcomes this problem. First, the operator selects a set of coordinate directions and a feedrate as previously described. This establishes a family of tracing planes parallel to the coordinate plane defined by the selected coordinate directions. By plane steering controls, the operator can rotate these planes about the coordinate axes. In effect, the operator can steer the tracing planes within the coordinate system until it is approximately perpendicular to the surface to be traced. Such a position provides for the most accurate tracing. FIG. 1d shows a model 12 in a skewed position. Assume the operator chose the X-axis 10 direction and the Y-axis 11 direction. This defines a family of planes perpendicular to the Z-axis 14. Then he steers the plane through a first angle 18 and a second angle 19. The feedrate vector 15 and the quadrature vector 16 define a specific tracing plane 17 approximately perpendicular to the surface being traced. Hence, the plane steering mode gives the operator the ability to directly trace complex models. Consequently, cost savings are realized in not having to make special patterns.

For purposes of illustration, FIG. 2 shows the tracer on a traveling column, bar-type milling machine with a hydraulic drive system. It is to be understood the tracing apparatus may be adapted to other machine configurations and other drive systems. The machine illustrated consists of a bed 28 with ways 30 on its top surface. The ways 30 run in a direction perpendicular to the surface of the paper as viewed by the reader. Supported on the bed 28 is a vertical column 32. Fastened to its bottom surface are slides 34 that mate with the ways 30 of the bed 28. A hydraulic motor 36 is mechanically connected through driving members 38 and 40 to a pinion 42. The pinion 42 by pushing against a rack 44 drives the column 32 along the longitudinal axis of the bed 28. This action is initiated by an electrical analogue signal transmitted to a hydraulic servo valve 46. The servo valve 46 controls the flow of fluid into the hydraulic motor 36. A feedback device 48 is mechanically connected to the hydraulic motor 36 to detect its movement. Mounted on top of the column 32 is a servo valve 50 identical to the other valve 46. The servo valve 50 controls the fluid flow to the hydraulic motor 52 which drives a ball screw 54. Mounted on a nut 56 of the ball screw 54 is a carrier 58. Mounted on a hydraulic motor 52 and detecting the vertical motion of the carrier 58 is another feedback device 60. Fastened to the carrier 58 are vertical slides 62 that mate with the vertical ways 64 on the column 32. Centrally located on the surface of the carrier 58, facing the reader, are ways 66 and a ball screw 68. Connected to the ball screw 68 is a hydraulic motor 70 which is controlled by a servo valve 72. Detecting motion of the ball screw 68 is a feedback device 74. Mounted on the nut 76 of the ball screw 68 is a spindle housing 78. The ball screw 68 provides motion in a direction mutually perpendicular to the longitudinal and vertical movements previously described. The spindle housing 78 is guided by slides 80 which mate with the ways 66 on the carrier 58. Mounted in the end of the spindle housing 78 is the tracing unit 82. The model 12 is mounted on an angle plate 84 that is on a base 85 opposite the tracing finger 13.

There are several methods known in the tracer art to detect the contour of a model. For example, mechanical, optical, or sonic techniques may be used. For purposes of this disclosure, the tracing head has a transducer that translates the output of the detection system in to an analogue error signal. Through a given increment of motion, the error signal magnitude represents the difference between the actual position of the tracing finger and the theoretical position as determined by the contour of the model. The tracing head, used in this system, is an electromechanical model that is thoroughly described in U.S. Pat. No. 2,868,087 issued to J. M. Morgan, Jr. on Jan. 13, 1959.

Figure 3A:
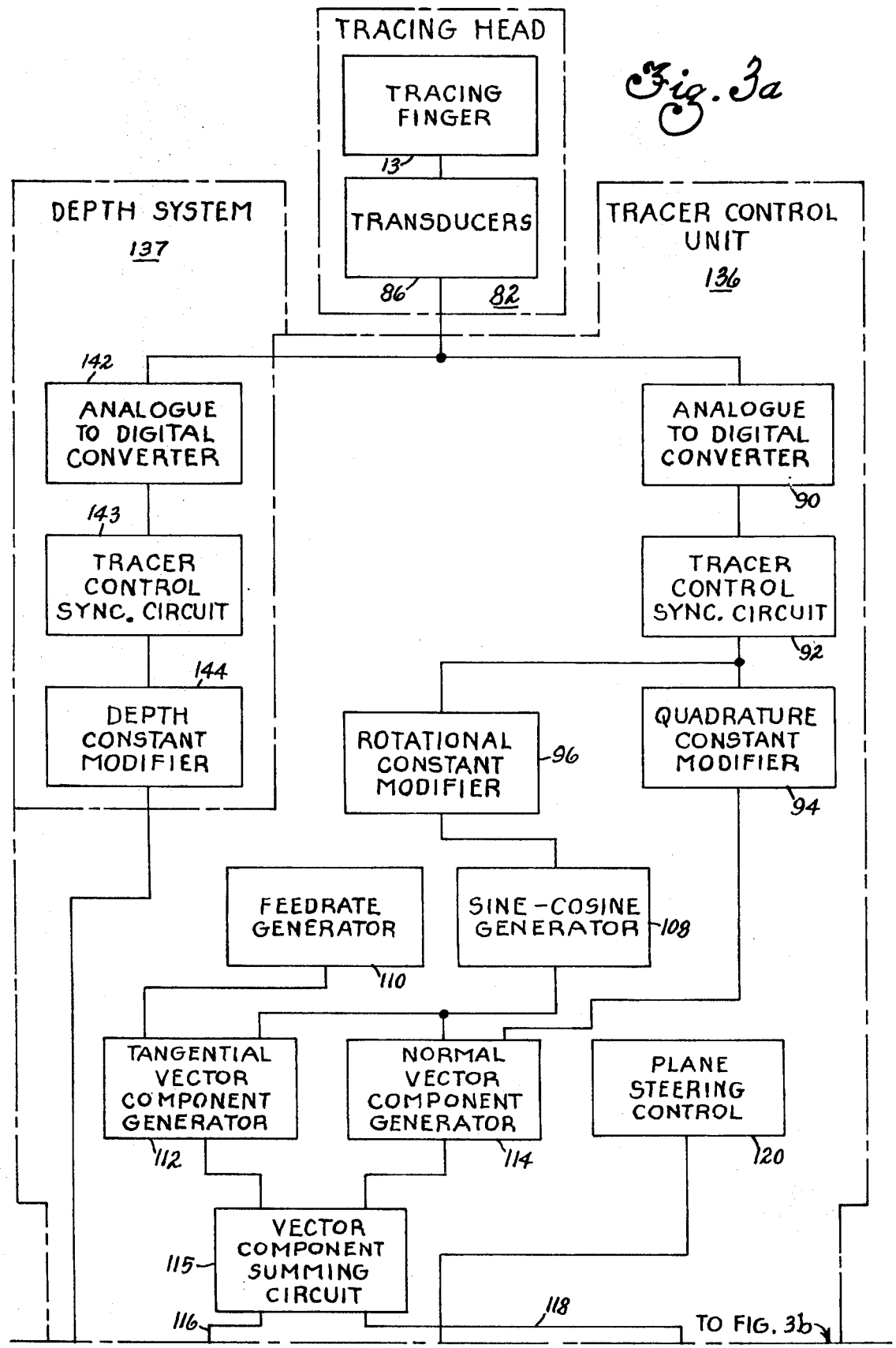
FIGS. 3a and 3b when joined along the indicated junction line, represent the functional block and line diagram of the entire control system.
Figure 3B:
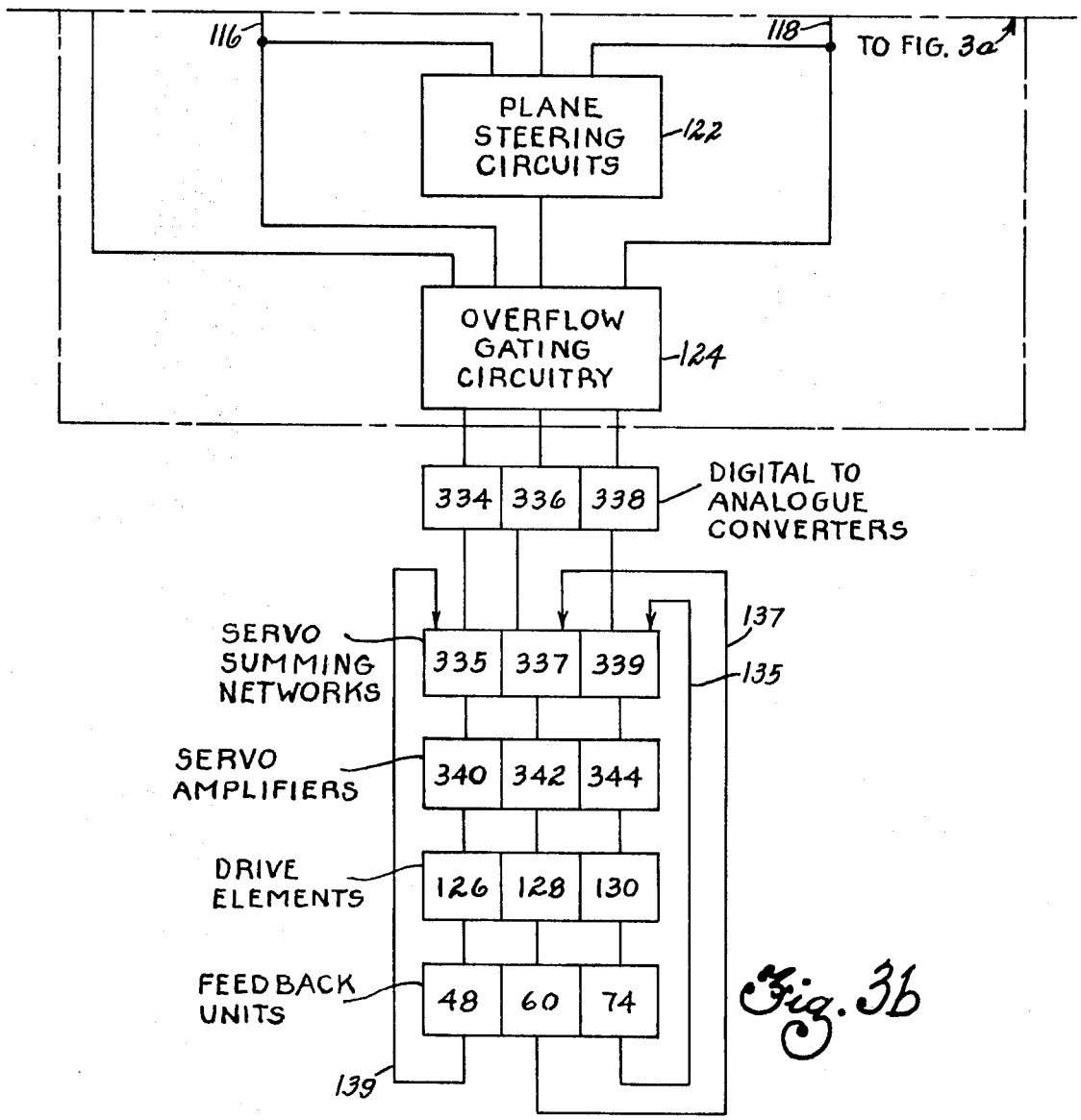
Figure 3D:
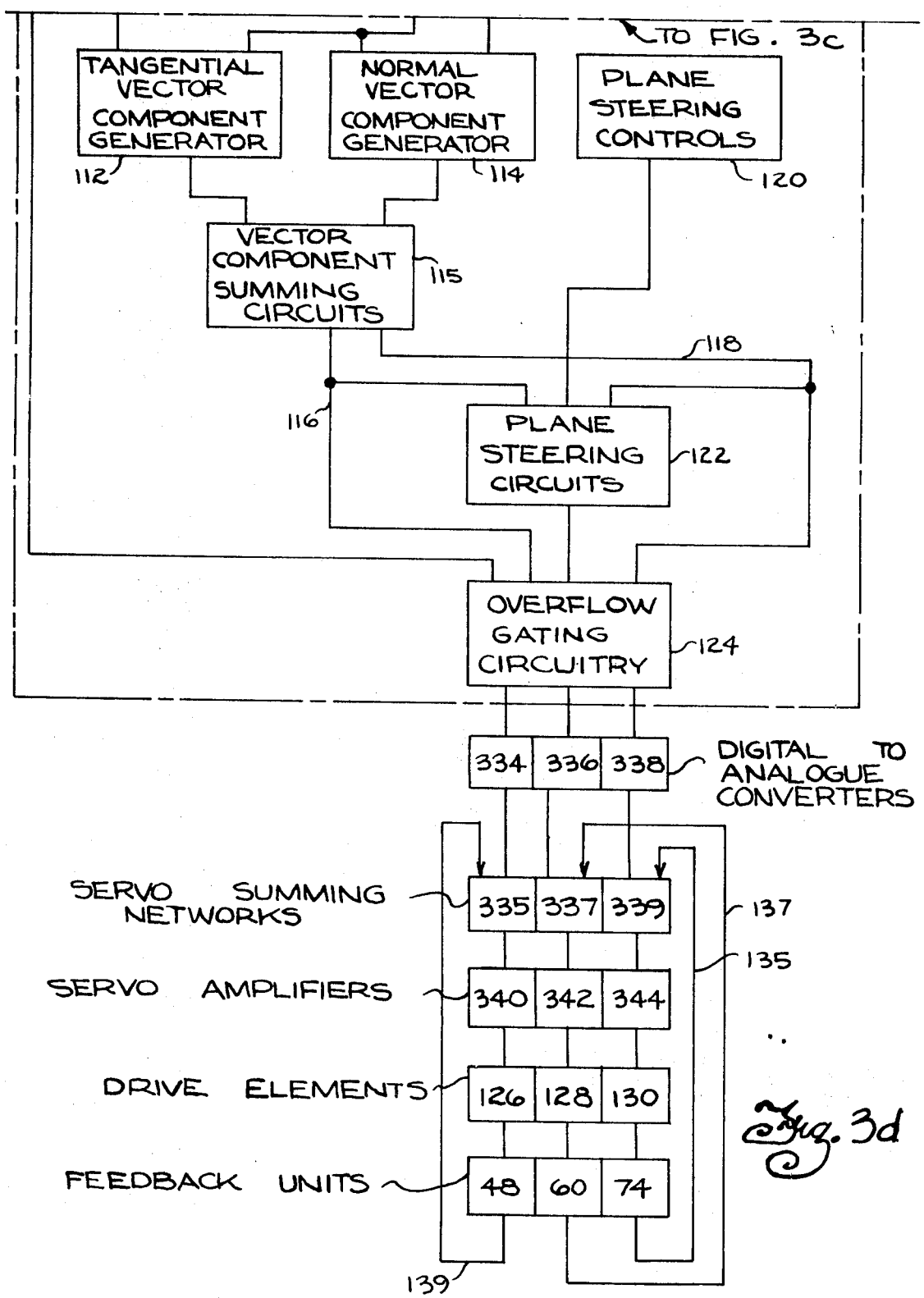

FIGS. 3a and 3b when joined along the indicated junction line represent a functional block diagram of one embodiment of the tracer control system. It should be remembered that the general description portion of the specification is functional in nature to aid in the understanding of the whole tracer control. Each important block of FIG. 3 will be structurally defined and its operation explained later in the description of operation. The tracer control of FIGS. 3c, and 3d is identical to the tracer control of FIGS. 3a and 3b with the exception that an improved configuration of elements is provided in the depth system for tracing in the Combination Mode.

In the system of FIG. 3a, the tracing head 82 detects the presence of a model by means of a the rotational finger 13. Mechanically connected to the tracing finger 13 are transducers 86. The transducers 86 provide planar deflection signal continuous in time and analogous to the total tracing finger deflection. An analogue to digital converter 90 converts the analogue planar deflection signal into an error signal representing a binary expression as a function of to the planar deflection signal magnitude. The converter 90 contains a zero centered counter whose output is a digital word representative of sign and magnitude of the error signal. In the tracer control sync circuit 92, the error signal modifies the frequency of a serial stream pulse source output by an amount proportional to the digital word magnitude. The modified serial stream of pulses drives the quadrature constant modifier 94 and the rotational constant modifier 96. These circuits provide rate gain adjustments. They control the rate of response of the digital tracer control system to changes in deflection as the tracing finger moves across the model. The inputs to these circuits are signal defining predetermined constant values that are set and stored in binary switches. The quadrature constant modifier 94 governs the response of the system in a direction perpendicular to the tracing path at the point of the trace. The rotational constant modifier 96 controls the response of the system to changes of direction.

Figure 4:
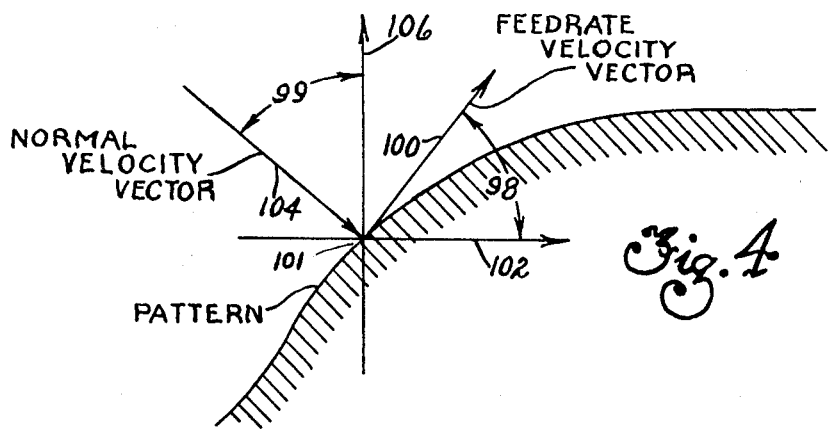
FIG. 4 is a representation of the error quantities that exist at the point of the trace and is an aid to understanding the rotational system.

Reference to FIG. 4 will aid in this discussion. A change of direction can be represented by an angle of rotation 98 having a vertex at the point 101. One side of the angle is defined by and moves with the feedrate velocity vector 100. The stationary side is defined by an axis of the tracing plane 102. An identical angle 99 also having its vertex at the point 101 is formed by the normal velocity vector 104 and another axis of the tracing plane 106. The point 101 represents the point of contact between the tracing finger (not shown) and the pattern; for purposes of this disclosure, the terms "point of the trace" or "tracing point" refer to the point 101. Thus, the rotational constant controls the response of the system to changes in the angle of rotation 98. Returning to FIG. 3a the output of the rotational constant modifier 96 is a pulse stream which provides a driving function for sine-cosine generator 108. After selecting alignment and coordinate directions, initial alignment by the operator causes the generator 108 to be filled with digital planar signals representing the proper sine and cosine values of a planar angle of rotation. Each output pulse of the modifier 96 represents an angular change and initiates an iterative process within the generator 108. Each iteration is an incremental integration and appropriately updates the sine and cosine values. The details of the generator 108 and the process will be described later. The digital planar signals and a variable pulse rate from the feedrate generator 110 are inputs to the tangential vector component generator 112. The output of the feedrate generator 110 is a pulse rate representative of the feedrate selected by the operator. Also, digital planar signals and a serial pulse stream from the quadrature constant modifier 94, representing the normal vector, are inputs to the normal vector component generator 114. The component generators 112 and 114 project the feedrate and quadrature vectors onto coordinate axes by scaling the variable pulse rate and serial stream of pulses as a function of the sine and cosine values of the planar angle of rotation and generating pulse strings representing vector components that are parallel to the original coordinate directions selected by the operator. After appropriate summation of the pulse strings in the vector component summing circuit 115, the outputs 116 and 118 are strings of pulses which represent velocity vectors in the tracing plane parallel to the selected coordinate directions. These velocities are necessary to compensate for the error detected by the tracing finger and to simultaneously maintain the selected tracing feedrate. When not in the plane steering mode, these velocities are routed through the overflow gating circuitry 124 and to their corresponding machine servo input.

In the Plane Steering Mode, the plane steering controls 120 permit the operator, by means of two handwheels, to rotate the tracing plane through two steering angles. First, the tracing plane may be rotated about a coordinate axis parallel to an axis determined by one of the velocity vectors 116 and 118. Second, the tracing plane may be rotated about an axis perpendicular to the first rotational axis. This is done within the coordinate system formed by the axes of the machine. Within the plane steering controls 120, the angles of rotation are measured by optical digital encoders connected to operator's handwheels. Each encoder has two nonlinear scales having digital representations analogous to sine and cosine relations. A third scale indicates quadrant. Each encoder produces digital steering signals which are accumulated and stored in binary counters. The digital steering signals represent sine and cosine values of steering angles of rotation. As the handwheels are turned, the digital sine and cosine values are continuously updated in the counters. The digital steering signals defining the sine and cosine values of the angles of rotation and the strings of pulses representing the velocity vectors 116 and 118 are inputs to the plane steering circuits 122 in FIG. 3b. The plane steering mode skews the velocity vectors 116 and 188 with respect to the selected coordinate directions. In the plane steering circuits, the digital steering signals of each set of sine and cosine values divides a signal representing a respective velocity vector into vector components parallel to the coordinate axes. The pulse trains defining components are summed in the overflow gating circuitry 124 and output to the proper machine servomechanism inputs as drive signals representing three velocity vectors, each parallel to a coordinate axis. The drive signals are converted in digital to analogue converters 334, 336, and 338 from a digital representation to an analogue signal. The analogue signals are one input to respective servo summing networks 335, 337 and 339. The output sums feed the respective servoamplifiers 340, 342, and 344 which activate the drive elements 126, 128, and 130. Monitoring the drive elements 126, 128, and 130 are feedback devices 48, 60, and 74 whose outputs 135, 137, and 139 are a second input to the servo summing networks 335, 337, and 339. Consequently, the machine is drive at the commanded velocity and in such a direction as to decrease the error detected by the tracing head.

Returning to FIG. 3a, the tracer control 136 includes a depth system 137 that is used when the tracer is in the depth or combination modes. A depth deflection signal representing deflection in the depth direction is received from the transducers 86. It is routed through an analogue to digital converter 142. The digital output is passed through a tracer control sync circuit 143, a depth rate gain adjustment 144 and into the overflow gating circuitry 124. The overflow gating circuitry 124 routes the depth signal into a servo summing network that causes the drive elements to respond in a manner previously described.

FIGS. 3c and 3d illustrate an alternative embodiment of the depth system. As previously described a major problem in the Combination Mode is the lack of feedrate control in the depth direction. For the most accurate tracing, the feedrate in the depth direction should be a vector component of the selected feedrate. As the depth path changes, the depth feedrate component should correspondingly change to maintain the resultant feedrate equal to the selected feedrate. In the original embodiment, it is not unusual for the depth feedrate to change the resultant feedrate by as much as 50 percent. These sharp deviations in stock removal over the ideal cutting conditions results in erratic finishes and excessive cutter wear. The Combination Mode taught in the alternative embodiment eliminates the problem of uncontrolled feedrate variations. The depth and planar feedrate vectors will always have a vector sum equal to the selected feedrate.

Referring to FIG. 3c, the blocks having common identities with those shown in FIG. 3a have the same function as earlier described. Hence the output of the tracer control sync circuit 143 is a digital signal representing the magnitude of error in the depth direction. This signal is input to a depth constant modifier 144 and a depth quadrature constant modifier 109, which are similar in construction and function respectively to the rotational constant modifier 96 and the quadrature constant modifier 94 of the planar system. Therefore, modifiers 109 and 144 are rate gain adjustments that govern the response of the system in the depth direction. The output of the depth constant modifier 144 is a driving function for a sine-cosine generator 111 functionally identical to the generator 108. After initial alignment, the generator contains digital depth signals representing the sine and cosine values of a depth angle of rotation which is defined by an included angle between a velocity vector tangent to the depth path at the tracing point and a plane perpendicular to the depth direction. The digital depth signals and the variable pulse rate from the feedrate oscillator 110 are input to the feedrate vector component generator 113. By scaling the variable pulse rate as a function of the sine and cosine values of the depth angle of rotation, the generator 113 produces serial pulse rates representing vector component projections of the selected velocity vector onto an axis in the depth direction and the plane perpendicular to the depth direction. The sine and cosine outputs of the generator 111 are also input to the depth quadrature vector component generator 119, which has the output of the modifier 109 as a second input. By scaling the output of the modifier 109 as a function of the sine and cosine values of the depth angle of rotation, the generator 119 produces pulse rates representing vector component projections of the velocity vector normal to the depth path at the tracing point onto an axis parallel to the depth direction and a plane perpendicular to said axis. The pulse rates representing the projections in the depth direction are summed in the vector component summing circuit 121. One output of summing circuit 121 is routed through the overflow gating network 124 and into its respective servomechanism input. The projections onto the plane are also input to the summing circuit 121. A second output is input to the tangential vector component generator 112 shown in FIG. 3d. The operation of this device and the succeeding circuitry is the same as previously described.

DESCRIPTION OF OPERATION

Referring in general to the block diagrams 3a, 3b, 3c and 3d, block 82 contains transducers and a switching and gating network to control the distribution of tracing error signals. Blocks 92 and 143 contain synchronization networks which are responsive to the error signals for producing trains of response Blocks 94, 96, 109 and 144 provide rate gain adjustments as will be explained later. The use of these blocks is optional and is a matter of engineering discretion. Blocks 111, 112, 113, 114, 115, 119, 120, 121, 122 and 124 or a combination thereof can be considered a cyclically operable pulse generator for producing drive signals to the servomechanism inputs.

Figure 6:
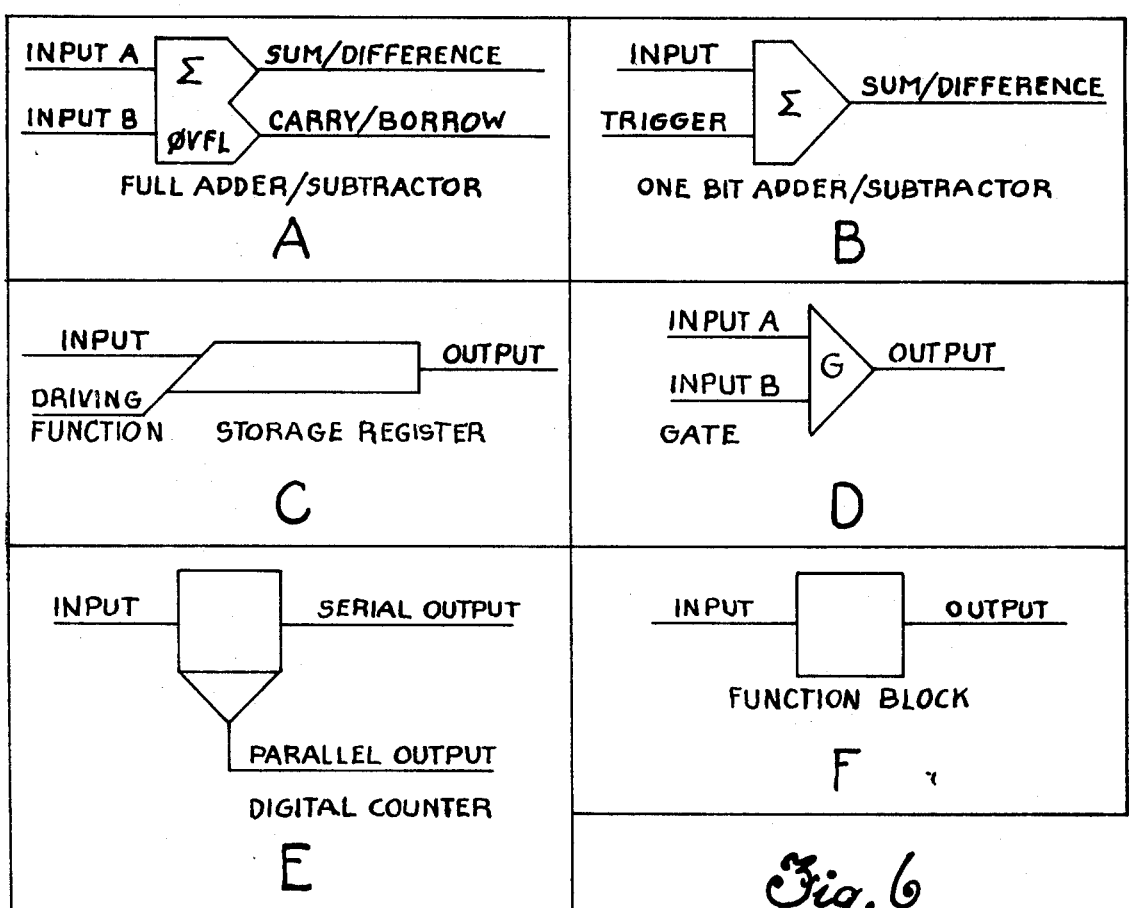
FIGS. 6a, 6b, 6c, 6d, 6e, and 6f, are keys to explain the meaning of the symbols used in the detailed schematic diagrams.

As an aid to understanding the description a brief explanation of the drawings is necessary. FIGS. 7a through 7e represent a detailed block diagram of the complete digital tracer control. FIG. 6 is a key defining structure of the various blocks. The symbol in FIG. 6a represents a binary full serial adder/subtracter. This allows the addition or subtraction of two binary expressions. This device provides for storage of an additive carry or subtractive borrow. Such devices are commercially available in modular form. FIG. 6b represents a one bit adder subtracter. This allows the addition or subtraction of a single bit to a binary expression at a time determined by the trigger input. The logic for this configuration is well-known in the art. The symbol in FIG. 6c represents a storage register. This is comprised of serially connected logic flip-flops. The input information is shifted one stage at a time through the register. A single driving function pulse will cause information in each stage to shift one place toward the least significant bit. Hence, an important characteristic of such a register is that the driving function can simultaneously execute a shifting out of contained information ad a shifting in of new information. The logic flip-flops comprising each serial stage are commercially available. The symbol of FIG. 6d represents a logic gate. Even though logic gates use commercially available elements, the combination of elements may differ. Any particular combination can be readily derived by simplifying Boolean expressions for each logic gate function. FIG. 6e is a digital counter with serial and parallel outputs. Its structure will be described later. FIG. 6f represents a function block. The function and structure of each of these blocks will be described as necessary.

Unless otherwise stated, the Plane Steering Mode of operation will be assumed. The detailed structure of the tracing head is shown in FIG. 3 and disclosed in columns 6, 7 and 8 under the Tracing Head subtitle of the Morgan Patent previously cited. In this disclosure, a general structural description should suffice. In referring to FIG. 7a, the tracing finger 13 and the transducers 150 and 152 are contained within the tracing head. The tracing finger is mechanically connected to a first block with a conical seat. Whenever a deflection exists perpendicular to the longitudinal axis of the tracing finger, a motion is transmitted to said first block. This motion is transferred through a ball resting in the conical seat of the first block and into a second block under spring tension. An armature 154 of a differential transformer 150 is fastened to the second block. Windings 156 and 158 for the transformer 150 are rigidly mounted to the tracing head. The secondary windings 158 of the differential transformer 150 are wound in phase opposition. Hence, when the armature 154 is symmetrically located about the windings 156 and 158, the transformer output is zero. However, any deflection perpendicular to the longitudinal axis will cause movement of the armature 154 and provide an analogous AC signal on the transformer output. Rigidly connected to the tracing finger 13 is a second armature 160 of a second differential transformer 152. Windings 162 and 164 for the second transformer 152 are rigidly fastened to the tracing head. Any deflection parallel to the longitudinal axis of the tracing finger causes movement of the second armature 160. This results in an AC signal output of the second transformer 152 analogous to deflection parallel to the longitudinal axis.

In summary, as the tracing finger 13 scans the model 12, the resultant mechanical deflection is measured by two differential transformers 150 and 152. Transformer 150 measures deflection in a plane perpendicular to the longitudinal axis of the tracing finger. Transformer 152 measures deflection colinear with the longitudinal axis.

In the Plane Steering Mode, a signal analogous to total tracer deflection is necessary. Therefore, the signal from the depth secondary 164 is passed through a 90° phase shift network 166. The phase shifted output is an input to a logic gate 168 that connects the depth secondary 164 in series with the planar secondary 158. The output of the planar secondary 158 is an AC signal truly analogous to total vector deflection of the tracing finger 13. This signal is then passed through a rectifying circuit 170 and a DC filter 172. The phase shift network 166, the rectifier 170, and the DC filter 172 are discrete component circuits with design equations and parameters published and readily available. The current magnitude of the output of the DC filter 172 represents the total vector magnitude of deflection of the tracing finger. This is one of several inputs to a first block of a digital to analogue converter 90. The first block is a current summing amplifier 174, consisting of a basic resistive current summing circuit with a resistive feedback around an operational amplifier. The output current is the algebraic sum of all the input currents. A second input 176 to the summing amplifier 174 is a feed back loop from the digital counter 190. The feedback represents the magnitude of error that has been converted. The third input 178 to the summing network 174 is a constant current bias representing the hang free to null deflection. This bias current is an output of a simple approximate constant current source 180.

Figure 5A:
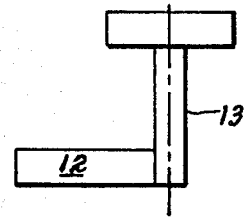
FIGS. 5a, 5b, 5c, and 5d, graphically illustrate the hang-free to null deflection, system null, and deflection about the system null.
Figure 5B:
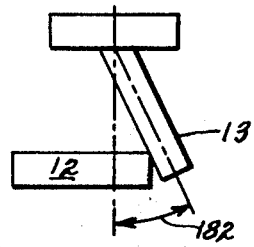
Figure 5C:
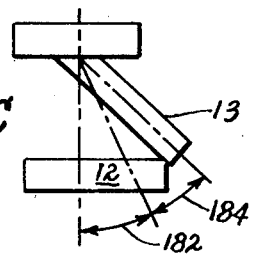
Figure 5D:
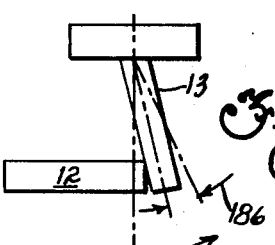

The hang free to null deflection prevents the tracer system null from coinciding with the tracer mechanical null. FIG. 5 illustrates the necessity for hang free to null deflection. FIG. 5a shows the tracing finger 13 contacting the pattern 12 in the mechanical null or hang free position. If the tracer finger 13 moves into the pattern 12, or over deflects, a deflection will be detected. If the tracer finger 13 moves away from the pattern 12, or under deflects, no deflection is detected. Therefore, with the tracer system operating about the mechanical null, no electrical distinction exists between the null and under deflection. FIG. 5b illustrates the system null as defined by the hang free to null deflection 182. An electrical bias defines the system null with the tracing finger 13 in a deflected position.

The magnitude of deflection 182 is defined as the hang free to null deflection. Hence, in FIG. 5c, if the tracing finger 13 moves into the pattern 12, or over deflects, this deflection 184 is electrically defined. However, the maximum overdeflection electrically definable is limited by tracing head and control design. Likewise in FIG. 5d, if the tracing finger 13 moves away from the pattern 12, or under deflects, this deflection 186 is also electrically defined until the hang free to null deflection is exceeded. To summarize, the network 180 defines an unambiguous system null condition; and deflections from such null are electrically distinguished. Hence, it is to be understood that whenever the term "deflection" is used, it means deflection from the system null position. Also, whenever the term "total deflection" is used, it means deflection from the mechanical null position.

Figure 7A:
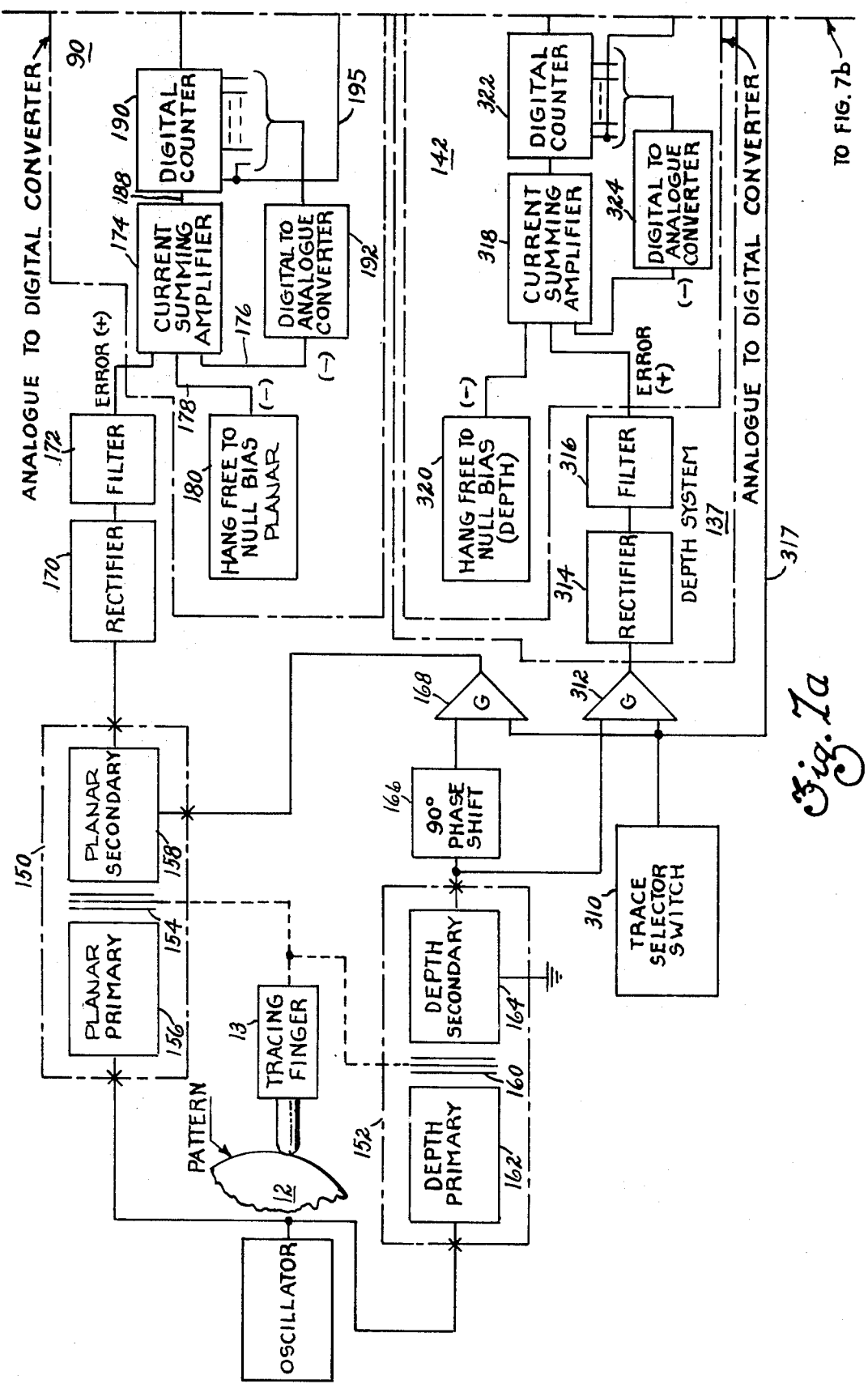

Returning to FIG. 7a, the output 188 of the current summing amplifier 174 is a control signal that represents the sign of the error with respect to the system null. This is used to gate a zero centered directional counter 190. The state of the binary signal determines the count direction. Thus whenever the control signal is a positive signal, the counter 190 counts in one direction; and whenever the control signal is a negative signal, the counter 190 counts in the opposite direction. The zero state of the counter is defined at the point where the most significant counter position changes state. A true state of the most significant counter position defines a positive magnitude. A false state defines a negative magnitude. Hence, positive numbers can be directly read out of the counter. Negative numbers being below center are in an inverted or one's complemented form. They must be recomplemented before the digital representations can be directly used. The counter 190 contains a planar error signal defining a representation of deflection from system null in the form of a number word that defines the magnitude and direction of said error. The counter 190 transmits the sign and magnitude in parallel into a digital to analogue converter 192. This is a solid state device that produces an analogous DC signal for each counter digit. These signals are summed and routed back into the current summing network 174 as the feedback signal 176. The output of the counter 190 is also transmitted serially through a one's complementer 194 and into a digital differential analyzer 196 as shown in FIG. 7b. The one's complementer 194 is a well-known logic configuration. When the most significant position of the counter 190, which is the sign bit on line 195, switches to a false state, the one's complementer recomplements the negative magnitude. Thus, the digital value representing a negative magnitude becomes a direct analogy of error.

The digital differential analyzer 196, hereinafter called a DDA, is shown in one of its conventional embodiments. This configuration is labeled a DDA multiplier and is functionally identified as a rate multiplier. The use of DDA multipliers defines a rate or velocity system. The magnitude of error is converted into a rate or velocity quantity that controls the response of the machine servo inputs according to the system gain. The function of the control is to divide and redefine the initial velocity quantities into command velocity signals that are relevant on a machine having three mutually perpendicular axes of motion. Characteristically, the output 198 of the DDA multiplier 196 is a series of discrete pulses. The rate of pulse occurrence is determined by the frequency of the driving function 202 and the magnitude of the input 200. Functionally, the DDA multiplier is a rate multiplier or scaling device. The driving function is multiplied or scaled by a factor determined by the magnitude of the input. The operation of the DDA multiplier 196 will be described in detail and is identical to the other DDA multipliers. Information is serially input over an input line 200 and provides one input to a full serial adder/subtracter 206. The other input is an output from a storage register 208 which is initially at zero. When a pulse is received from the driving function 202, the information on the input line 200 is added to the contents of the storage register 208. The adder output 210 containing the sum is recirculated back into the storage register 208. This process is called an iteration. After several iterations, the sum of the storage register 208 will exceed the register capacity. This excess or overflow is released as an output pulse on line 198. If the input 200 is a constant, the ratio of the rate of output pulses 198 to the frequency of the driving function 202 will be constant. If the input 200 or the frequency of the driving function changes, the above ratio will change accordingly.

The output 200 of the one's complementer 194 is an error signal which is the input to the DDA multiplier 196. The driving function 202 is a serial stream of pulses provided by the tracer control clock oscillator 212. The output 198 is a serial train of pulses synchronized with the tracer control clock that has a frequency proportional to the magnitude of deflection. Therefore, the multiplier 196 and the oscillator 212 comprise a tracer control synchronization circuit. The output 198 is used as a driving function for two other DDA multipliers, 214 and 216. These DDA multipliers, 214 and 216, are similar to the DDA multiplier 196 just described. The input signals to these DDA multipliers are signals representing constant digital expressions determined by system and performance specifications of a particular machine. The purpose of the multipliers 214 and 216 is to provide a rate gain adjustment. Gain is defined as the ratio of an output quantity of a device to a like input quantity. To maintain stability the ratio must be less than unity. In this case, for a given driving function frequency, the rate of output pulses is determined by the magnitude of the constant digital expression. These constants referred to as rate gains are less than unity, and input to the system by means of binary switches 218 and 220. The binary switches 220 containing the value of the quadrature constant supply a first signal representing a first binary expression to the DDA multiplier 216. The quadrature constant determines the response of the system in the tracing plane normal to the model surface. If the constant is too large, the system will oscillate. If the constant is too low, the tracing finger will drift in the tracing plane about the system null. Such drift will cause excessive tracing error in the part. Hence the binary switches 220 and the multiplier 216 function as a quadrature constant modifier. The set of binary switches 218 contain a second signal representing the value of the rotational constant. This signal is transmitted to the DDA multiplier 214 and controls the response of the system in the tracing plane to deviations from a linear path. If the constant is too large, the tracing finger will hunt or limit cycle as it moves from the linear path. In other words, the tracing finger will cycle through successive under deflect and over deflect conditions before it settles into system null. If the rotational constant is set too low, the system will not be sensitive enough to detect minor changes along the path of the trace. This will reduce the accuracy of tracing. The rotational constant must be adjusted in a manner inversely proportional to feedrate. The feedrate selector switch 222 provides feed rate signals to a digital divider network 224. This network 224 is a series of binary dividers. Each binary divider is comprised of a well-known configuration of logic flip-flops. If the feedrate selector switch 222 increases the feed rate range by a factor of 8, the digital divider 224 decreases the magnitude of the rotational constant by a factor of 8. If the feedrate range is decreased, the divider circuits correspondingly increase the magnitude of the rotational constant. Thus the binary switches 218, the feed rate selector switch 222, the digital divider 224, and the multiplier 214 operate as a rotational constant modifier. In effect, the DDA multipliers 214 and 216 are rate gain adjustments to control the response of the tracer system to changes of the tracing finger about system null.

The output of the DDA multiplier 214 is a pulse stream used as a driving function for a sine-cosine generator 226 shown in FIG. 7c. The generator consists of two identical DDA integrators. One integrator contains digital planar signals representing sine values and the other integrator contains digital planar signals representing cosine values of the planar angle of rotation. An integrator is comprised of two registers, 228 and 236, a one bit adder/subtracter 230, and a full serial adder/subtracter, 234. The output of the input register 228 is routed into a one bit adder/subtracter 230. The output of the one bit adder/subtracter provides the desired sine value and is an input to both the register 228 and the full adder/subtracter 234. The other input of the full adder/subtracter 234 is the output of the second register 236. The input to the second register 236 is the sum output 237 of the full adder/subtracter 234. The overflow or carry output 239 is used as a gate for the one bit adder/subtractor 238 in the second DDA integrator. On startup, the initial alignment is executed in a direction selected by the operator. If the generator 226 always starts out in the first quadrant and along a coordinate axis, alignment can only occur in one of two places, i.e., along one of the coordinate axes; hence, either the sine value is a maximum and the cosine value a minimum or the cosine value is a maximum and the sine value a minimum. By producing a signal to set inputs on the flip-flops of a register, the register can be set to a maximum value or filled with all ones; and by producing a signal to a reset input on the flip-flops of a register, the register can be set to a minimum value or filled with all zeros. Assume alignment parallel to an axis where the sine value is unity and the cosine value is zero. The align direction control 227 would produce a signal to the set inputs of input register 228 and to the reset inputs of register 240. When the generator 226 receives a pulse from its driving function, the register 228 iterates using the full adder 234. If an overflow results, the one bit adder/subtracter 238 of the second DDA integrator is gated to add one bit. The second input register 240 is updated and iterated using the full adder 242. If an overflow results, the one bit adder/subtracter 230 of the first DDA integrator is gated to subtract, and the input register 228 is updated. Thus, each input register 228 and 240 contains digital planar signals representing the sine and cosine magnitudes for each incremental change of planar the angle of rotation. If the sign bit in the bidirectional counter 190 changes, this indicates the direction of rotation has changed; and the values of the sine and cosine must change accordingly. It is necessary that the digital magnitudes retrace their previous steps exactly for each driving pulse. For every point of rotation, the value of the sine and cosine must be consistent regardless of which direction of rotation was used to reach that point. Therefore, when the sign bit on line 195 changes value indicating a change in direction, the full adder/subtracters 234 and 242 reverse functions to become subtracters; an the one bit adder/subtracters 230 and 238 also reverse function. Consequently, any digital path is accurately retraced and specific sine-cosine values are exactly repeated with no digital error within the resolution of the control system.

The sine-cosine generator 226 always operates in the first quadrant. Given the initial quadrant and the selected coordinate directions, the initial direction or sign of movement is established. After the initial alignment, the sign is controlled by a quadrant counter 243. This device monitors the sine and cosine outputs; and by sensing when the values go to zero, the quadrant counter can correspondingly change the sign. The quadrant counter 243 produces a first binary signal defining the sign of the sine value of the planar angle of rotation, and a second binary signal defining the sign of the cosine value of the planar angle of rotation, therefore, the sine cosine generator 226, the align control 227 and the quadrant counter 243 define the structure of the sine cosine generators of FIG. 3.

Figure 7D:
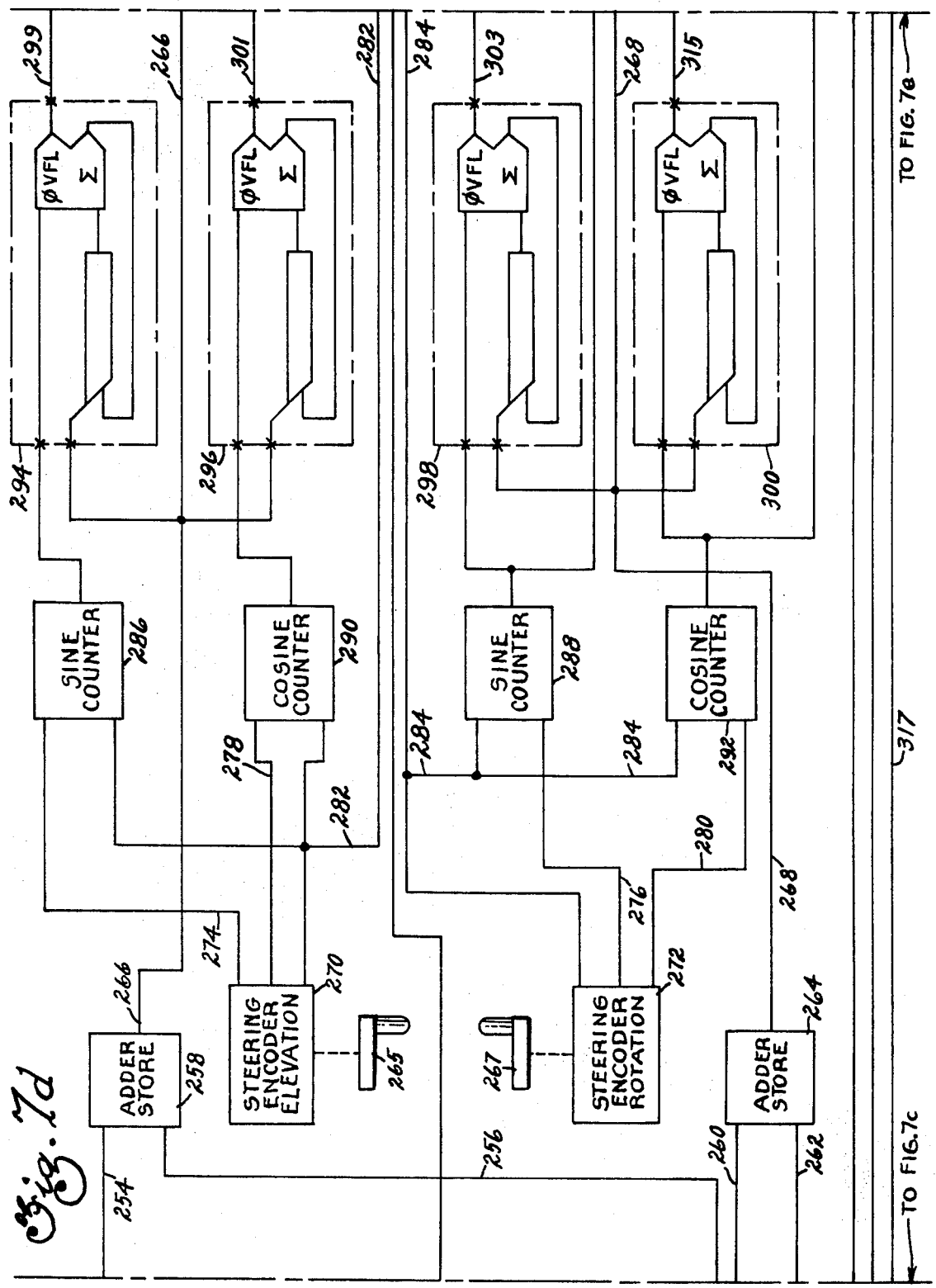

The digital planar signals defining the sine value are routed into two DDA multipliers 244 and 246. The digital planar signals defining the cosine value are transmitted to DDA multipliers 248 and 250. The DDA multipliers 244, 246, 248, and 250 are identical in construction and operation to DDA multiplier 196 previously described. A variable pulse rate is produced by an adjustable feedrate oscillator 252 which functions as a feedrate generator and provides a driving function for one sine-cosine set of DDA multipliers 246 and 250. The adjustable feedrate oscillator is a voltage controlled device well known in the art. The pulse rate from the feedrate oscillator 252 represents a velocity magnitude tangential to the point of the trace. Rate multiplication of the variable pulse rate representing the tangential velocity magnitude by the digital planar signals representing the sine and cosine values of the planar angle of rotation projects said magnitude onto coordinate axes. This produces serial pulse strings representing vector component magnitudes parallel to the selected coordinate directions. Thus the multipliers 246 and 250 comprise a tangential vector component generator. The output pulse stream from the DDA multiplier 216 is used to drive the other sine-cosine set of DDA multipliers 244 and 248. The output pulse stream represents the quadrature velocity magnitude normal to the point of the trace and is rate multiplied by the digital planar signals representing the sine and cosine values of the planar angle of rotation. This multiplication projects the quadrature magnitude in a manner as described above and produces pulse strings representing two other velocity component magnitudes parallel to the selected coordinate axes. Hence the multipliers 244 and 248 comprise a normal vector component generator. In FIG. 7d, the serial pulse string 262 representing the sine component of the feedrate velocity magnitude is summed in an adder store 264 with a pulse string 260 representing the cosine component of the quadrature velocity magnitude. The adder store 164 is a simple two-stage storage configuration well known in the art. Likewise, the pulse string 254 and serial pulse string 256 are summed in a similar adder store 258. Thus the adder stores 258 and 264 comprise a vector component summing circuit. The output strings of pulses 266 and 268 represent velocity magnitudes parallel to the selected coordinate directions.

To summarize briefly, the operator selects the coordinate directions of the trace and the feedrate. The analogue to digital converter provides an error signal defining a binary expression representing deflection from system null. The magnitude of this expression is used to modulate the frequency of the clock oscillator output. The modulated output is routed through two parallel rate gain adjustments. The output of one represents the quadrature vector magnitude. The other is used to drive the sine-cosine generator. The selected feedrate controls the output of the feedrate oscillator which represents the feedrate vector magnitude. The quadrature and feedrate vector magnitudes define the tracing plane. The output of the sine-cosine generator is used to divide these magnitudes into two new vector magnitudes 266 and 268 in the tracing plane. The vector magnitudes 266 and 268 are parallel to the selected coordinate directions. These vector magnitudes, representing the velocity magnitudes necessary to maintain the selected feedrate while decreasing the tracer error, are then routed to their respective servomechanism inputs.

By use of the Plane Steering Mode, the operator may skew the tracing plane with respect to the coordinate axes. Therefore, the tracer control must redefine the vector magnitudes 266 and 268 into new vector quantities on the machine coordinate axes. The plane steering circuits are illustrated in FIGS. 7d and 7e. Handwheels 265 and 267 provide means for steering the tracing plane about the model. Turning handwheel 265 rotates the plane about a coordinate axis parallel to an axis determined by the direction of velocity magnitude 268. Likewise, handwheel 267 rotates the tracing plane about another coordinate axis perpendicular to the first rotational axis. Mechanically connected to the respective handwheels are digital optical encoders 270 and 272. The encoders 270 and 272 each have three nonlinear scales. Two of the scales in each encoder have sinusoidal pulse distributions with a 90 mechanical degree phase shift between them. Hence, the channel outputs 274 and 276 carry digital steering signals representing incremental changes in the sine value; and the channel outputs 278 and 280 carry digital signals representing incremental changes in the cosine value. The third channel outputs 282 and 284 indicate the quadrant or sign. The encoders sine channel output 274 and 276 are routed into digital counters 286 and 288. Likewise, the cosine channel outputs 278 and 280 are routed into two other digital counters 290 and 292. The counters 286, 288, 290, and 292, are simple binary counters comprised of a group of serially connected logic flip-flops. Each time a pulse appears on the encoder output, the counter clocks or updates one increment. The sense of the counters is controlled by third encoder channels 282 and 284 detecting the quadrant. Therefore the handwheels 265 and 267, steering encoders 270 and 272, and counters 286, 288, 290, and 292 define a plane steering control. It should be noted that the steering can also be performed by the use of analogue transducers. Such devices output analogue signals representing sine and cosine magnitudes of an angle created by the transducer rotation. The analogue signals are input to an analogue to digital converter which generates digital signals equivalent to the outputs of the digital counters described above. The counters 286, 288, 290, and 292 output digital signals into DDA multipliers 293, 294, 295, 296, 298 and 300. These DDA multipliers are identical to DDA multiplier 196. The DDA multipliers 294 and 296 have as inputs the digital steering signals representing the sine and cosine values of the first steering angle of rotation, said rotation occurring about a coordinate axis parallel to an axis determined by the velocity magnitude defined by the string of pulses 268. This rotation causes velocity magnitude 266 to be skewed with respect to the coordinate axes. This velocity magnitude is projected onto the coordinate axes by rate multiplying the string of pulses 266 by the sine and cosine values of the first steering angle of rotation. In this circuit configuration, the second steering encoder causes rotation about a coordinate axis perpendicular to a plane determined by the selected coordinate direction. This rotation skews the velocity magnitude represented by the string of pulses 268 and the cosine component defined by pulse train 301 with respect to the coordinate axes. The digital steering signals representing the sine value of the second steering angle of rotation is input to DDA multipliers 293 and 298. The digital steering signals representing the complementary cosine value of the second steering angle of rotation is input to DDA multipliers 295 and 300. These skewed velocity magnitudes are projected back on to the coordinate axes by rate multiplying the string of pulses 268 and the pulse train 301 by the sine and cosine values of the second steering angle of rotation. This rate multiplication produces serial pulse trains 303, 311, and 315 representing new velocity magnitude components. Thus, the rate multiplication circuits 293, 294, 295, 296, 298 and 300 comprise the plane steering circuits.

It should be noted at this point that there are many possible combinations of steering angles. However, given the selected coordinate directions and the steering circuitry shown in FIG. 7d, two very specific steering angles are defined. It is evident that these angles can easily be changed by interchanging the inputs 266 and 268, by changing the steering circuit configuration or by selecting different coordinate directions. Geometrically, rotation about any two coordinate axes from a coordinate plane provides sufficient information to describe any plane in the machine coordinate system. Therefore, changing the steering angles or the coordinate reference does not expand on the scope and spirit of this invention.

As described above, the steering system generates a plurality of velocity component magnitudes represented by output pulse trains 299, 303, 311, 313 and 315. Pulse rate 299 determines the velocity magnitude in one coordinate direction. The algebraic sum of pulse trains 303 and 313 and the sum of pulse trains 311 and 315 determine the velocity magnitudes in the other two coordinate directions. The algebraic summation is performed in the digital to analogue converters; therefore, all the velocity component magnitudes are routed into the overflow gating network 304. The gating network also has the sign and coordinate direction signals as inputs. The sign signals are composed of the output of the quadrant counter 243 and the quadrant channel outputs 282 and 284 of the plane steering encoders 270 and 272. The coordinate directions are determined by the plane selector switch 306 which produces signals defining the tracing plane i terms of the coordinate axes selected by the operator. Given these signals, the gating network 304 makes the appropriate logic selections to route the input pulse trains to the proper servomechanism inputs. The trains of pulses 305, 307, and 309 are then transmitted into a second gating network 308 shown in FIG. 7f. Again, this network is comprised of a combination of commercially available elements, a particular combination being readily available upon simplification of the appropriate Boolean algebraic expressions. The function of gating network 308 is to perform switching according to the tracing mode. If the system is in the plane steering mode, trains of pulses pass through the gating network 308 and provide drive signals for the appropriate servomechanism inputs. If the selector switch 310 in FIG. 7a is switches to the Depth or Combination Mode, the switch 310 produces switching signals on the line 317 to the gating network 308 for switching in the depth trace system 137 shown in FIGS. 7a and 7b. Therefore, the gating networks 304 and 308 combine to form the overflow gating circuitry.

In FIG. 7a when the trace selector switch 310 is switched to the Depth or Combination Mode, an output switching signal on line 317 switches the gating networks 168 and 312. This switching action opens the series connection between the transformer secondaries 158 and 164. The depth secondary 164 is routed through the gating network 312 which allows the signal to pass into the depth system. The gating network 168 switches that side of the planar secondary 158 to ground. The planar secondary 158 remains a part of the plane system as previously described. The output of the gating network 312 is an AC signal analogous to total deflection parallel to the longitudinal axis of the tracing finger. This signal is passed through a rectifier 314 and filter 316. The filter output is an input to one leg of a summing amplifier 318, constituting the first block of the analogue to digital converter 142. It should be noted that all circuit elements described in the depth system have counterparts similar in operation and structure in the planar system. Hence, the rectifier 314, filter 316, and summing amplifier 318 are respectively similar to the rectifier 170, filter 172, and summing amplifier 174. The depth hang free to null circuit 320 is similar in theory and function to the hang free to null circuit 180. The output of the summing amplifier 318 is transmitted to a digital counter 322 of similar construction to the digital counter 190. The error signal is fed back to the summing network 318 by passing through a digital to analogue converter 324, identical to the digital to analog converter 192. A depth error signal representative of depth deflection from the counter 322 is passed through a one's complementer and into a DDA multiplier 328 shown in FIG. 7b. The DDA multiplier 328 has the serial stream of pulses from the tracer control clock oscillator 212 as a driving function. It is similar in operation and consturction to the DDA multiplier 196. The output of DDA multiplier 328 is a serial train of pulses having a frequency analogous to deflection from the depth system null and synchronized with the tracer control clock. Thus the multiplier 328 and oscillator 212 comprise a tracer control synchronization circuit for the depth system. This is a driving function for DDA multiplier 330. The input for the DDA multiplier 330 is supplied by binary switches 332 which provide an output signal defining a constant value. The function of the DDA multiplier 330 is similar to that of DDA multiplier 216. This modifier controls the response of the system to deflection in a direction parallel to the longitudinal axis of the tracing head. Hence the multiplier 330 and switches 332 comprise a depth constant modifier. The output of DDA multiplier 330 is a serial pulse stream that is transmitted to the overflow gating network 308 in FIG. 7e. The overflow gating network 308 then provides a drive signal to the appropriate servo input.

FIGS. 7b1, 7c1 and 7c2 illustrate the schematic diagram of the alternative embodiment of the depth system for the Combination Mode. For a complete understanding FIGS. 7b1, 7c1 and 7c2 should be inserted in place of FIG. 7b and 7c in the overall schematic diagram.

FIG. 7b1 shows the addition of the depth quadrature constant modifier consisting of the binary switches 350 which provide a signal representing a constant value to the DDA multiplier 352. The serial train of pulses, from multiplier 328 provides a driving function for the multiplier 352. These elements provide rate gain adjustments the theory of which has been earlier described. The outputs of DDA multipliers 330 and 352 are serial pulse streams representing error in the depth direction but attenuated by their respective rate gain circuits. The output of multiplier 330 provides a driving function for a sine-cosine generator 354 shown in FIG. 7c. The generator 354 is identical to the sine-cosine generator 226 previously described. Generator 354 produces digital depth signals representing the sine and cosine magnitudes of a depth angle of rotation defined by a included angle formed between a velocity vector tangent to the depth path at the tracing point and a plane perpendicular to the depth direction. After the align direction control 227 aligns the generator 354 to the initial angle, the trace is started. When a pulse is received from multiplier 330 indicating an angular change, the generator 354 cycles to produce new digital depth values representing sine and cosine magnitudes corresponding to a new depth angle of rotation that will drive the depth system to null. The digital depth signal defining the sine magnitude is routed to DDA multipliers 356 and 358; the digital depth signal defining the cosine magnitude is input to DDA multipliers 360 and 362. The multipliers are identical to DDA multiplier 196. The serial pulse stream from multiplier 352 provides a driving function for multipliers 356 and 360 which combine to form a depth quadrature vector component generator. The variable pulse rate of the adjustable feedrate oscillator 252, previously described, drives multipliers 358 and 362 which comprise a feedrate vector component generator. By rate multiplying the variable pulse rate and one of the serial pulse streams by the sine value and the cosine value respectively of the depth angle of rotation, the velocity magnitudes represented by the driving functions are projected onto an axis defined by the depth direction. This rate multiplication produces a first serial pulse rate and a first pulse rate which are routed into the adder/subtractor 368. By rate multiplying the variable pulse rate and the one of the serial pulse streams by the cosine value and the sine value respectively of the depth angle of rotation, the same velocity magnitudes are projected onto a plane perpendicular to the depth direction. This rate multiplication produces a second serial pulse rate and a second pulse rate which are input to adder/subtracter 366. A third input to each adder/subtracter are signals representing the sign information from the quadrant counter 364. Counter 364, identical to quadrant counter 243, monitors the outputs of the generator 354 to determine the sign in the depth direction. Depending on the sign, the serial strings of pulses from adder/subtracters 366 and 368 will represent either the sum or the difference between the input projections. Thus adder subtractors 366 and 368 operate as a vector component summing circuit. Hence adder/subtracter 368 will output a serial string of pulses representing a velocity magnitude in the depth direction. This signal with the signals form the quadrant counter are routed through the gating network 308 and into a corresponding servomechanism. The output of adder/subtracter 366 is a serial string of pulses representing a velocity magnitude in a plane perpendicular to the depth direction. It defines a velocity magnitude tangent to the planar path at the tracing point. In the original embodiment this tangential magnitude was defined by the output of the feedrate oscillator 252. The alternative embodiment more correctly defines the tangential magnitude as only a component of the selected feedrate. The serial string of pulses from adder/subtracter 366 provides a driving function for DDA multipliers 246 an 250 shown in FIG. 7c2. By rate multiplying the serial string of pulses by the sine and cosine values of the planar angle of rotation produced by generator 226, this velocity magnitude is projected onto the coordinate axes. This process and the remainder of the circuits have been described earlier; and in this case, they operate in a similar manner.

The outputs of the gating network 308 in FIG. 7f are drive signals representing velocity vectors parallel to the axes of the machine. The drive signals provide inputs to the digital to analogue converters 334, 336, and 338. Each digital to analogue converter output is routed into one input of its respective servo summing network 335, 337, and 339. The algebraic sums are then input to servo amplifiers 340, 342, and 344. Each servoamplifier circuit is the same. The servoamplifier outputs are DC signals that are transmitted to the servo valves 46, 50 and 72. The servoamplifier circuitry is conventional in design and used in many machine systems. The servo valve is responsive to the sign and magnitude of the DC signal to control the amount and direction of fluid flow. The servo valves 46, 50 and 72 are hydraulically connected to respective hydraulic motors 36, 52, and 70. The hydraulic motors are mechanically connected to and drive their respective machine slides 32, 58, and 78. Part of the same drive train and mechanically connected to it are feedback devices 48, 60, and 74. The motion of the hydraulic motors 36, 52, and 70 provide a mechanical driving function. The output of the resolvers is an electrical signal, representative of such hydraulic motor motion. These feedback signals 135, 137, and 139 are routed to their respective servo summing networks 335, 337, and 339. Hence, the servo loop is completed; and the servo system is able to maintain absolute and continuous control of the machine elements as commanded by the input velocity vectors.

What is Claimed is:

1. An automatic control apparatus for producing drive signals to servomechanism inputs of three movable elements having three mutually perpendicular axes of motion defining a rectangular coordinate system, said drive signals being initiated by applying error signals from a tracing head to the control apparatus, said error signals include a depth signal representing tracing error detected in a direction parallel to one axis of the coordinate system and a planar signal representing tracing error detected in a plane perpendicular to the one axis, the apparatus comprising:

a. means for providing a constant frequency serial stream of pulses;

b. means responsive to the error signals and the serial stream of pulses for producing a serial train of pulses having a frequency that is a function of the magnitude of the error signals;

c. means for generating digital signals representing sine and cosine values of a tracing angle of rotation, said generating means being response to the serial train of pulses for incrementally changing the digital signals;

d. means for supplying a variable pulse rate adjustable in time and representing a predetermined tracing velocity magnitude; and e. a cyclically operable pulse generator responsive to the serial train of pulses, the digital signals and the variable pulse rate for generating the drive signals for the servomechanism inputs.

2. An automatic control apparatus for producing drive signals to servomechanism inputs of three movable elements having three mutually perpendicular axes of motion defining a rectangular coordinate system, said drive signals being initiated by applying error signals from a tracing head to the control apparatus, said error signals include a depth signal representing a tracing error detected in the direction parallel to one axis of the coordinate system and a planar signal representing a tracing error detected in plane perpendicular to the one axis, the apparatus comprising:

a. means for providing a constant frequency serial stream of impulses;

b. means responsive to the error signals and the serial stream of pulses for producing a firs serial train of pulses having a frequency proportional to the depth signal magnitude and a second serial train of pulses having a frequency proportional to the planar signal magnitude;

c. means responsive to the planar signal and the second serial train of pulses for generating digital planar signals representing sine and cosine values of a planar angle of rotation;

d. means for supplying a variable pulse rate adjustable in time and representing a predetermined tracing velocity magnitude;
e. means responsive to the digital planar signals and the second serial train of pulses for producing a first pulse string by scaling the second serial train of pulses as a function of the sine value of the planar angle of rotation and a second pulse string by scaling the second serial train of pulses is a function of the cosine value of the planar angle of rotation;
f. means responsive to the digital planar signals and the variable pulse rate for producing a first serial pulse string by scaling the variable pulse rate as a function of the cosine value of the planar angle of rotation and a second serial pulse string by scaling the variable pulse rate as a function of the sine value of the planar angle of rotation;
g. means responsive to the pulse strings and the serial pulse strings for summing the first pulse string with the first serial pulse string to produce a first string of pulses and the second pulse string with the second serial pulse string to produce a second string of pulses;
h. means having inputs responsive to the digital planar signals the strings of pulses, the depth signal, and the first serial train of pulses for combining the inputs to produce trains of pulses; and
i. means responsive to the trains of pulses for selectively producing a first drive signal output for reducing the error represented by the depth signal and a second drive signal output for reducing the error represented by the planar signal.

3. An automatic control apparatus for producing drive signals to servomechanism inputs of three movable elements having three mutually perpendicular axes of motion defining a rectangular coordinate system, said drive signals being initiated by applying error signals from a tracing head to the control apparatus, said error signals include a depth signal representing a tracing error detected in the direction parallel to one axis of the coordinate system and a planar signal representing a tracing error detected in a plane perpendicular to the one axis, the apparatus comprising:
 a. a clock oscillator for providing a constant frequency serial stream of pulses;
 b. a synchronizing network responsive to the error signals and the serial stream of pulses for producing a first signal train of pulses by rate multiplying the serial stream of pulses by a magnitude represented by the depth signal and a second serial train of pulses by rate multiplying the serial stream of pulses by a magnitude represented by the planar signal;
 c. a first digital gain network responsive to the second serial train of pulses for rate multiplying the second serial train of pulses by two signals representing the predetermined constant values and producing two pulse streams;
 d. means responsive to one of the pulse streams and the planar signal for generating digital planar signals representing sine and cosine values of a planar angle of rotation;
 e. a second digital gain network responsive to the first serial train of pulses for rate multiplying the first serial train of pulses by signal representing a predetermined constant value and producing a serial pulse streams;
 f. an adjustable feedrate oscillator for supplying a variable pulse rate adjustable in time and representing a predetermined tracing velocity magnitude;
 g. a first set of two rate multiplication circuits, each circuit having a first input connected to the other of the pulse streams, one of the circuits having a second input responsive to the digital planar signal representing the sine value of the planar angle of rotation and the other circuit having a second input responsive to the digital planar signal representing the cosine value of the planar angle of rotation, said circuits producing two pulses strings;
 b. a second set of two rate multiplication circuits, each circuit having a first input responsive to the variable pulse rate, one of the circuits having a second input responsive to the digital planar signal representing the sine value of the planar angle of rotation and the other of circuits having a second input responsive to the digital planar signal representing the cosine value of the planar angle of rotation, said circuits producing two serial pulse strings;
 i. an adder storage network having inputs responsive to the pulse strings and the serial pulses strings for producing two strings of pulses;
 j. a gating network having inputs responsive to the digital planar signals, the strings of pulses, the depth signal and the serial pulse stream for switching the inputs to produce trains of pulses; and the error
 k. a switching network responsive to the trains of pulses for selectively producing a first drive signal output for reducing the error represented by the depth signal and a second drive signal output for reducing the error represented by the planar signal.

4. An automatic control apparatus for producing drive signals to servomechanism inputs of three movable elements having three mutually perpendicular axes of motion defining a rectangular coordinate system, said drive signals being initiated by applying error signals from a tracing head to the control apparatus, said error signals include a depth signal representing a tracing error detected in a direction parallel to one axis of the coordinate system and a planar signal representing a tracing error detected in a plane perpendicular to the one axis, the apparatus comprising:
 means for providing a constant frequency serial stream of pulses;
 b. means responsive to the error signals and the serial stream of pulses for producing a first serial train of pulses having a frequency proportional to the depth signal magnitude and a second serial train of pulses having a frequency proportional to the planar signal magnitude;
 c. means responsive to the planar signal and the second serial train of pulses for generating digital planar signals representing sine and cosine values of a planar angle of rotation;
 d. means for supplying a variable pulse rate adjustable in time and representing a predetermined tracing velocity magnitude;
 e. means responsive to the first serial train of pulses and the depth signal for producing digital depth signals representing sine and cosine values of a depth angle of rotation;
 f. means responsive to the digital depth signals and the first serial train of pulses for producing a first pulse rate by scaling the first serial train of pulses as a function of the cosine value of the depth angle of rotation and a second pulse rate by scaling the first serial train of pulses as a function of the sin value of the depth angle of rotation;
 g. means responsive to the digital depth signals and the variable pulse rate for producing a first serial pulse rate by scaling the variable pulse rate as a function of the sine value of the depth angle of rotation and a second serial pulse rate by scaling the variable pulse rate as a function of the cosine value of the depth angle of rotation;
 h. means responsive to the digital depth signals, the pulse rates and the serial pulse rates for algebraically summing the first pulse rate with the first serial pulse rate to produce a first serial string of pulses and the second pulse rate with the second serial pulse rate to produce a second serial string of pulses;
 i. means responsive to the digital planar signals and the second serial train of pulses for producing a first pulse string by scaling the second serial train of pulses as a function of the sine value of the planar angle of rotation and a second pulse string by scaling the second serial train of pulses as a function of the cosine value of the planar angle of rotation;

j. means responsive to the digital planar signals and the second serial string of pulses for producing a first serial pulse string by scaling the second serial string of pulses is a function of the cosine value of the planar angle of rotation and a second serial pulse string by scaling the second serial string of pulses as a function of the sine value of the planar angle of rotation;

k. means responsive to the pulse strings and the serial pulse strings for summing the first pulse string with the first serial pulse string to produce a first string of pulses and the second pulse string with the second serial pulse string to produce a second string of pulses; and l. means having inputs responsive to the digital planar signals, the first serial string of pulses and the strings of pulses for combining the inputs to produce the drive signals for the servomechanism inputs.

5. An automatic control apparatus for producing drive signals to servomechanism inputs of three movable elements having three mutually perpendicular axes of motion defining a rectangular coordinate system, said drive signals being initiated by applying error signals from a tracing head to the control system, said errors signals include a depth signal representing a tracing error detected in a direction parallel to one axis of the coordinate system and a planar signal representing a tracing error detected in a plane perpendicular to the one axis, the apparatus comprising:

a. a clock oscillator providing a constant frequency serial stream of pulses;

b. a synchronizing network responsive to the error signals and the serial stream of pulses for producing a first serial train of pulses by rate multiplying the serial stream of pulses by the magnitude represented by the depth signal and a second serial train of pulses by rate multiplying serial stream of pulses by the magnitude represented by the planar signal;

c. a first digital gain network responsive to the second serial train of pulses for rate multiplying the second serial train of pulses by two signals representing predetermined constant values and producing two pulses streams;

d. means responsive to one of the pulse streams and the planar signal for generating digital planar signals representing sine and cosine values of a planar angle of rotation;

e. a second digital gain network responsive to the first serial train of pulses for rate multiplying the first serial train of pulses by two signals representing predetermined constant values and producing two serial pulses streams;

f. an adjustable feed rate oscillator for supplying a variable pulse rate adjustable in time and representing a predetermined tracing velocity magnitude;

g. means responsive to one of the serial pulse streams and the depth signal for producing two digital depth signals representing sine and cosine values of a depth angle of rotation;

h. a first set of two rate multiplication circuits, each circuit having a first input responsive to the other of the serial pulse streams, one of the circuits having a second input responsive to the digital depth signal representing the sine value of the depth angle of rotation and the other circuit having a second input responsive to the digital depth signal representing the cosine value of the depth angle of rotation, said circuits producing two pulse rates;

i. a second set of two rate multiplication circuits, each circuit having a first input responsive to the variable pulse rate, one of the circuits having a second input responsive to the digital depth signal representing the sine value of the depth angle of rotation and the other circuit having a second input responsive to the digital depth signal representing the cosine value of the depth angle of rotation, said circuits producing two serial pulse rates;

j. an adder/subtracter circuit having inputs responsive to the digital depth signals, the pulse rates and the serial pulse rates for producing two serial strings of pulses;

k. a third set of two rate multiplication circuits, each circuit having a first input connected to the other of the pulse streams, one of the circuits having a second input responsive to the digital planar signal representing the sine value of the planar angle of rotation and the other circuit having a second input responsive to the digital planar signal representing the cosine value of the planar angle of rotation, said circuits producing two pulses strings;

l. a fourth set of two rate multiplication circuits, each circuit having a first input responsive to one of the serial strings of pulses, one of the circuits having a second input responsive to the digital planar signal representing the sine value of the planar angle of rotation and the other of the circuits having a second input responsive to the digital planar signal representing the cosine value of the planar angle of rotation, said circuits producing two serial pulse strings;

m. an adder storage network having inputs responsive to the pulse strings and the serial pulse strings for producing two strings of pulses; and n. gating network having inputs responsive to the digital planar signals, the other of the serial strings of pulses and the strings of pulses for switching the inputs to produce the drive signals for the servomechanism inputs.

6. An automatic control apparatus for producing drive signals to servomechanism inputs of three movable elements having three mutually perpendicular axes of motion defining a rectangular coordinate system, said drive signals being initiated by applying error signals from a tracing head to the control apparatus, said error signals include a depth signal representing a tracing error detected in the direction parallel to one axis of the coordinate system and a planar signal representing a tracing error detected in a plane perpendicular to the one axis, the apparatus comprising:

a. means responsive to the error signals for summing said signals to produce a resultant error signal representing the magnitude of the total tracing error;

b. means for providing a constant frequency serial stream of pulses;

c. means responsive to the resultant error signal and the serial stream of pulses for producing a serial train of pulses having a frequency proportional to the magnitude of the resultant error signal;

d. means responsive to the resultant error signal and the serial train of pulses for generating digital planar signals representing sine and cosine values of a planar angle of rotation;

e. means for supplying a variable pulse rate adjustable in time and representing a predetermined tracing velocity magnitude;

f. means responsive to the digital planar signals and the serial train of pulses for producing a first pulse string by scaling the serial train of pulses as a function of the sine value of the planar angle of rotation and a second pulse string by scaling the serial train of pulses as a function of the cosine value of the planar angle of rotation;

g. means responsive to the digital planar signals and the variable pulse rate for producing a first serial pulse string by scaling the variable pulse rate as a function of the cosine value of the planar angle of rotation and a second serial pulse string by scaling the variable pulse rate as a function of the sine value of the planar angle of rotation;

h. means responsive to the pulse strings and the serial pulse strings for summing the first pulse string with the first serial pulse string to produce a first string of pulses and the second pulse string with the second serial pulse string to produce a second string of pulses;

i. means for generating digital steering signals representing sine and cosine values of a steering angle of rotation;

j. means responsive to the digital steering signals and one of the strings of pulses for producing a first pulse train by scaling the one of the strings of pulses as a function of the sine value of the steering angle of rotation nd a second pulse train by scaling the one of the strings of pulses as a function of the cosine value of the steering angle of rotation; and k. means having inputs responsive to the digital planar signals, the digital steering signals, the other of the strings of pulses and the pulse trains for combining the inputs to produce the drive signals for the servomechanism inputs.

7. An automatic control apparatus for producing drive signals to servomechanism inputs of three movable elements having three mutually perpendicular axes of motion defining the rectangular coordinates system, said drive signals being initiated by applying error signal from a tracing head to the control apparatus said, error signals include a depth signal representing a tracing error detected in a direction parallel to one axis of the coordinate system and a planar signal representing a tracing error detected in a plane perpendicular to the one axis, the apparatus comprising:

a. a phase shift network responsive to the depth signal for shifting the phase of the depth signal one quarter of a period in time;

b. a gating network responsive to the phase shifted depth signal for switching the phase shifted depth signal in series with the planar signal to produce a resultant error signal representing the magnitude of the total tracing error;

c. a clock oscillator for providing a constant frequency serial stream of pulses;

d. a synchronizing network responsive to the resultant error signal and the serial stream of pulses for producing a serial train of pulses by rate multiplying the serial stream of pulses by the magnitude of resultant error signal;

e. a digital gain network responsive to the serial train of pulses for producing two pulse streams by rate multiplying the serial train of pulses by two signals representing predetermined constant values;

f. means responsive to the resultant error signal and one of the pulse streams for generating digital planar signals representing sine and cosine values of a planar angle of rotation;

g. an adjustable feed rate oscillator for supplying a variable pulse rate adjustable in time and representing a predetermined tracing velocity magnitude;

h. a first set of two rate multiplication circuits, each circuit having a first input responsive to the other of the pulse streams, one of the circuits having a second input responsive to the digital planar signal representing the sine value of the planar angle of rotation and the other circuit having a second input responsive to the digital planar signal representing the cosine value of the planar angle of rotation, said circuits producing two pulse strings;

i. a second set of two rate multiplication circuits, each circuit having a first input responsive to the variable pulse rate, one of the circuits having a second input responsive to the digital planar signal representing the cosine value of the planar angle of rotation and the other circuit having a second input responsive to the digital planar signal representing the sine value of the planar angle of rotation, said circuits producing two serial pulse strings;

j. an adder storage network having inputs responsive to the pulse strings and the serial pulses strings for producing two strings of pulses;

k. a manually operable transducer circuit for producing digital steering signals representing sine and cosine values of a steering angle of rotation;

l. a third set of two rate multiplication circuits, each circuit having a first input responsive to one of the strings of pulses, one of the circuits having a second input responsive to the digital steering signal representing the sine value of the steering angle of rotation and the other of the circuits having a second input responsive to the digital steering signal representing the cosine value of the steering angle of rotation, said circuits producing two pulse trains; and m. a gating network having inputs responsive to the digital planar signals, the digital steering signals, the other of the strings of pulses and the pulse trains for switching the inputs to produce the drive signals for the servomechanism inputs.

8. An automatic control apparatus for producing drive signals to servomechanism inputs of three movable elements having three mutually perpendicular axes of motion defining a rectangular coordinate system, said drive signals being initiated by applying error signals from a tracing head to the control apparatus, said error signals include a depth signal representing a tracing error detected in a direction parallel to one axis of the coordinate system and a planar signal representing a tracing error detected in a plane perpendicular to the one axis, the apparatus comprising:

a. means responsive to the error signals for summing said signals to produce a resultant error signal representing the magnitude of the total tracing error;

b. means for providing a constant frequency serial stream of pulses;

c. means responsive to the resultant error signal and the serial stream of pulses for producing a serial train of pulses having a frequency proportional to the magnitude of the resultant error signal;

d. means responsive to the resultant error signal and the serial train of pulses for generating digital planar signals representing sine and cosine values of a planar angle of rotation;

e. means for supplying a variable pulse rate adjustable in time and representing a predetermined tracing velocity magnitude;

f. means responsive to the digital planar signals and the serial train of pulses for producing a first pulse string by scaling the serial train of pulses as a function of the sine value of the planar angle of rotation and a second pulse string by scaling the serial train of pulses as a function of the cosine value of the planar angle of rotation;

g. means responsive to the digital planar signals and the variable pulse rate for producing a first serial pulse string by scaling the variable pulse rate as a function of the cosine value of the planar of rotation and a second serial pulse string by scaling the variable pulse rate as a function of the sine value of the planar of rotation;

h. means responsive to the pulse strings and the serial pulse strings for summing the first pulse string with the first serial pulse string to produce a first string of pulses and the second pulse string with the second serial pulse string to produce a second string of pulses;

i. means for generating a first set of digital steering signals representing sine and cosine values of a first steering angle of rotation;

j. means responsive to the first set of digital steering signals and one of the strings of pulses for producing a first pulse train by scaling the one of the strings of pulses as a function of the sine value of the first steering angle of rotation and a second pulse train by scaling the one of the strings of pulses as a function of the cosine value of the first steering angle of rotation;

k. means for generating a second set of digital steering signals representing sine and cosine values of a second steering angle of rotation;

l. means responsive to the second set of digital steering signals and the other of the strings of pulses for producing a first serial pulse train by scaling the other of the strings of pulses as a function of the sine value of the second steering angle of rotation and a second serial pulse train by scaling the other of the strings of pulses as a function of the cosine value of the second steering angle of rotation;

m. means responsive to the second set of digital steering signals and one of the pulse trains for producing a third serial pulse train by scaling the one of the pulse trains as a function of the sine value of the second steering angle of rotation and a fourth serial pulse train by scaling the one of the pulse trains as a function of the cosine value of the second steering angle of rotation; and n. means having inputs responsive to the digital planar signals, the digital steering signals, the other of the pulse trains and the serial pulse trains for combining the inputs to produce the drive signals for the servomechanism inputs.

9. An automatic control apparatus for producing drive signals to servomechanism inputs of three movable elements having three mutually perpendicular axes of motion defining a rectangular coordinate system, said drive signals being initiated by applying error signals from a tracing head to the control apparatus, said error signals include a depth signal representing a tracing error detected in a direction parallel to one of the axes of the coordinate system and a planar signal representing a tracing error detected in a plane perpendicular to the one axis, the system comprising:

a. a phase shift network responsive to the depth signal for shifting the phase of the depth signal one quarter of a period in time;
   b. a gating network responsive to the phase shifted depth signal for switching the phase shifted in series with the planar signal to produce a resultant error signal representing the magnitude of the total tracing error;
   c. a clock oscillator for providing a constant frequency serial stream of pulses;
   d. a synchronizing network responsive to the resultant error signal and the serial stream of pulses for producing a serial train of pulses by rate multiplying the serial stream of pulses by the magnitude represented by the resultant error signal;
   e. a digital gain network responsive to the serial train of pulses for producing two pulse streams by rate multiplying the serial train of pulses by two signals representing predetermined constant values;
   f. means responsive to the resultant error signal and one of the pulse streams for generating digital planar signals representing sine and cosine values of a planar angle of rotation;
   g. an adjustable feed rate oscillator for supplying a variable pulse rate adjustable in time and representing a predetermined tracing velocity magnitude;
   h. a first set of two rate multiplication circuits, each circuit having a first input responsive to the other of the pulse streams, one of the circuits having a second input responsive to the digital planar signal representing the sine value of the planar angle of rotation and the other circuit having a second input responsive to the digital planar signal representing the cosine value of the planar angle of rotation, said circuits producing two pulse strings;
   i. a second set of two rate multiplication circuits, each circuit having a first input responsive to the variable pulse rate, one of the circuits having a second input responsive to the digital planar signal representing the cosine value of the planar angle of rotation and the other circuit having a second input responsive to the digital planar signal representing the sine value of the planar angle of rotation, said circuits producing two serial pulse strings;
   j. an adder storage network having inputs responsive to the pulse strings and the serial pulses strings for producing two strings of pulses;
   k. a first manually operable transducer circuit for producing a first set of digital steering signals representing sine and cosine values of a first steering angle of rotation;
   l. a third set of two rate multiplication circuits, each circuit having a first input responsive to one of the strings of pulses, one of the circuits having a second input responsive to the digital steering signal representing the sine value of the first steering angle of rotation and the other circuit having a second input responsive to the digital steering signal representing the cosine value of the first steering angle of rotation, said circuits producing pulse trains;
   m. a second manually operable transducer circuit for producing a second set of digital steering signals representing sine and cosine values of a second steering angle of rotation;
   n. a fourth set of two rate multiplication circuits, each circuit having a first input responsive to the other of the strings of pulses, one of the circuits having a second input responsive to the digital steering signal representing the sine value of the second steering angle of rotation and the other circuit having a second input responsive to the digital steering signal representing the cosine value of the second steering angle of rotation, said circuits producing serial pulse trains;
   o. a fifth set of two rate multiplication circuits, each circuit having a first input responsive to one of the pulse trains, one of the circuits having a second input responsive to the digital steering signal representing the sine value of the second steering angle of rotation and the other circuit having a second input responsive to the digital steering signal representing the cosine value of the second steering angle of rotation, said circuits producing serial pulse trains; and
   p. a gating network having inputs responsive to the digital planar signals, the digital steering signals, the other of the pulse trains and the serial pulse trains for combining the inputs to produce the drive signals or the servomechanism inputs.